US012005019B2

(12) United States Patent
Choi et al.

(10) Patent No.: US 12,005,019 B2
(45) Date of Patent: Jun. 11, 2024

(54) MASSAGE MODULE AND MASSAGE DEVICE COMPRISING SAME

(71) Applicant: BODYFRIEND CO., LTD., Seoul (KR)

(72) Inventors: Sung Chan Choi, Seoul (KR); Cheul Kyu Jin, Busan (KR); Myeong Jin You, Incheon (KR); Gi Won Um, Gwangmyeong-si (KR); Jong Sick Park, Seoul (KR)

(73) Assignee: BODYFRIEND CO., LTD., Seoul (KR)

( * ) Notice: Subject to any disclaimer, the term of this patent is extended or adjusted under 35 U.S.C. 154(b) by 968 days.

(21) Appl. No.: 16/970,836

(22) PCT Filed: Aug. 10, 2018

(86) PCT No.: PCT/KR2018/009222

§ 371 (c)(1),
(2) Date: Aug. 18, 2020

(87) PCT Pub. No.: WO2019/160207

PCT Pub. Date: Aug. 22, 2019

(65) Prior Publication Data

US 2020/0375842 A1 Dec. 3, 2020

(30) Foreign Application Priority Data

Feb. 19, 2018 (KR) ........................ 10-2018-0019205

(51) Int. Cl.
*A61H 15/00* (2006.01)
*A61H 7/00* (2006.01)

(52) U.S. Cl.
CPC ......... *A61H 15/0078* (2013.01); *A61H 7/007* (2013.01); *A61H 2015/0014* (2013.01);
(Continued)

(58) Field of Classification Search
CPC ........ A61H 15/0078; A61H 2015/0007; A61H 2015/0014; A61H 2015/0021;
(Continued)

(56) References Cited

U.S. PATENT DOCUMENTS 6,200,282 B1 * 3/2001 Furuie .................. A61H 23/006
601/108
6,656,140 B2 12/2003 Oguma et al.
(Continued)

FOREIGN PATENT DOCUMENTS

JP 2014-036748 A 2/2014
KR 10-0431382 B1 5/2004
(Continued)

*Primary Examiner* — Joseph D. Boecker
*Assistant Examiner* — Brian T Khong
(74) *Attorney, Agent, or Firm* — Bridgeway IP Law Group, PLLC; Sang Ho Lee; Hyun Woo Shin

(57) ABSTRACT

Provided is a massage module and a massage device including same. The massage module may include: a procedure member including an upper finger member and a lower finger member cooperating with the upper finger member; and a cam driving part connected to the upper finger member so as to move the upper finger member in the vertical direction, so that the upper finger member and the lower finger member are away from or close to each other.

18 Claims, 13 Drawing Sheets

(52) U.S. Cl.
CPC ................ *A61H 2201/0149* (2013.01); *A61H 2201/1215* (2013.01); *A61H 2201/123* (2013.01); *A61H 2201/1418* (2013.01); *A61H 2201/1454* (2013.01)

(58) Field of Classification Search
CPC .... A61H 2015/0028; A61H 2015/0035; A61H 2015/0042; A61H 2015/005; A61H 7/007; A61H 7/002; A61H 7/004; A61H 2007/009; A61H 2201/0149; A61H 2201/0138; A61H 2201/1215; A61H 2201/1207; A61H 2201/12; A61H 2201/123; A61H 2201/1418; A61H 2201/1472; A61H 2201/1454; A61H 2201/1676; A61H 2201/1678; A61H 2203/0431
See application file for complete search history.

(56) References Cited

U.S. PATENT DOCUMENTS

| | | | | |
|---|---|---|---|---|
| 2005/0192520 | A1* | 9/2005 | Morita | A61H 15/0078 601/102 |
| 2007/0299377 | A1* | 12/2007 | Shiraishi | A61H 7/007 601/134 |
| 2009/0177128 | A1* | 7/2009 | Fukuyama | A61H 7/001 601/134 |
| 2012/0065559 | A1* | 3/2012 | Chen | A61H 15/0078 601/116 |
| 2016/0193105 | A1* | 7/2016 | Ishiguro | A61H 7/007 601/134 |

FOREIGN PATENT DOCUMENTS

| | | | |
|---|---|---|---|
| KR | 10-2006-0122783 | A | 11/2006 |
| KR | 10-2008-0022548 | A | 3/2008 |
| KR | 10-2017-0072042 | A | 6/2017 |

* cited by examiner

MASSAGE MODULE AND MASSAGE DEVICE COMPRISING SAME

TECHNICAL FIELD

The present disclosure relates to a massage module and a massage device including the same, and more particularly, to a massage module configured to provide a massage like kneading with a human hand and a massage device including the same.

BACKGROUND ART

Recently, a massage module configured to implement a sophisticated massage operation in a massage device has been provided. A part which generates a massage effect in the massage module is a treatment member. The treatment member generally includes a pair of left and right massage arms and massage balls vertically fixed to each of the massage arms.

A conventional massage device includes a massage module configured to beat the back and shoulders of a user while vertically moving in a central area of a backrest portion.

As described above, the conventional massage module is vertically movable but is restricted in movement in a front-rear direction in the massage device. That is, the conventional massage module has a shape simply fixed to the massage device and is restricted in adjusting a level of massage intensity such that the user may physically discomfort when receiving a massage for a long time. Also, the conventional massage module simply beats a body of the user with massage balls and has a limitation in providing the user with a more sophisticated massage.

DISCLOSURE

Technical Problem

The present disclosure is directed to providing a massage module configured to implement a massage like kneading with a human hand using a hand-shaped treatment member on the basis of a massage device and a massage device including the massage module.

Other aspects of the present disclosure are not limited to the above-stated aspect and other unstated aspects of the present disclosure will be understood by those skilled in the art from the following description.

Technical Solution

According to an aspect of the present invention, there is provided a massage module including a treatment member including an upper finger member and a lower finger member configured to cooperate with the upper finger member and a cam driving portion link-connected to the upper finger member and configured to vertically move the upper finger member and the lower finger member to be far away from or close to each other.

The cam driving portion may be link-connected to the upper finger member and vertically move the upper finger member through eccentric rotation. Also, the lower finger member may move vertically to be away from or close to the upper finger member while cooperating with movement of the upper finger member.

The treatment member may include two finger gears formed on the upper finger member and the lower finger member and configured to be engaged with each other and to rotate in mutually opposite directions.

The cam driving portion may include a cam driving motor configured to generate a rotational force, a kneading shaft connected to a driving shaft of the cam driving motor and configured to rotate corresponding to driving of the cam driving motor, and a cam unit connected to the kneading shaft and configured to eccentrically rotate on the kneading shaft corresponding to rotation of the kneading shaft.

The cam unit may include an unbalanced cover connected to the kneading shaft and a cam cover on which the unbalanced cover is fit and to which the unbalanced cover is coupled.

The cam unit may further include a cam bearing inserted between the unbalanced cover and the cam cover.

The treatment member may include an upper finger gear configured to rotate corresponding to vertical movement of the upper finger member and in which a stopper gear groove configured to hold and regulate rotational movement to restrict vertical movement displacement of the upper finger member is formed, and a lower finger gear formed to come into contact with the upper finger gear and configured to transmit a rotational force in a direction opposite to a rotation direction of the upper finger gear to the lower finger member.

The treatment member may include a cam link which has one side connected to the cam driving portion using a pin method and the other side installed on the upper finger member.

A pair of such treatment members may be disposed on left and right sides and installed to be tilted at a certain angle toward a center.

The treatment member may include an upper finger housing link-connected to the cam driving portion, an upper finger bracket installed or formed on the upper finger housing to have a certain angle therebelow, and an upper massage roller rotatably installed on the upper finger bracket and configured to perform a massage.

The treatment member may include a lower finger housing, a lower finger bracket installed or formed on the lower finger housing to have a certain angle thereabove, and a lower massage roller rotatably installed on the lower finger bracket and configured to perform a massage.

The massage module may further include a lateral driving portion configured to laterally move the treatment member.

A pair of such treatment members may be provided. Also, the massage module may further include a lateral driving portion configured to laterally move the pair of treatment members to be away from or close to each other.

The massage module may further include a front-rear driving portion configured to move the treatment member in a front-rear direction.

The massage module may further include a vertical driving portion configured to vertically move the treatment member.

The vertical driving portion may include a vertical movement shaft located below a main bracket which supports the treatment member and to function as a shaft when the main bracket moves in a front-rear direction.

Advantageous Effects

According to the above-described massage module and massage device according to the present disclosure, a massage like kneading with a human hand may be implemented using a hand-shaped treatment member so as to provide a sense of soft and sophisticated massages beyond a conventional hard massage of simply beating.

DESCRIPTION OF DRAWINGS

A variety of aspects will now be described with reference to the drawings. Here, like reference numerals refer to like elements. In the following embodiment, for purpose of description, a variety of particular details will be provided to give overall understanding of one or more aspects. However, it is apparent that such aspect(s) may be implemented without the particular details. In other examples, well-known structures and devices are illustrated as block diagrams to easily describe one or more aspects.

BEST MODE OF THE INVENTION

Figure 1:
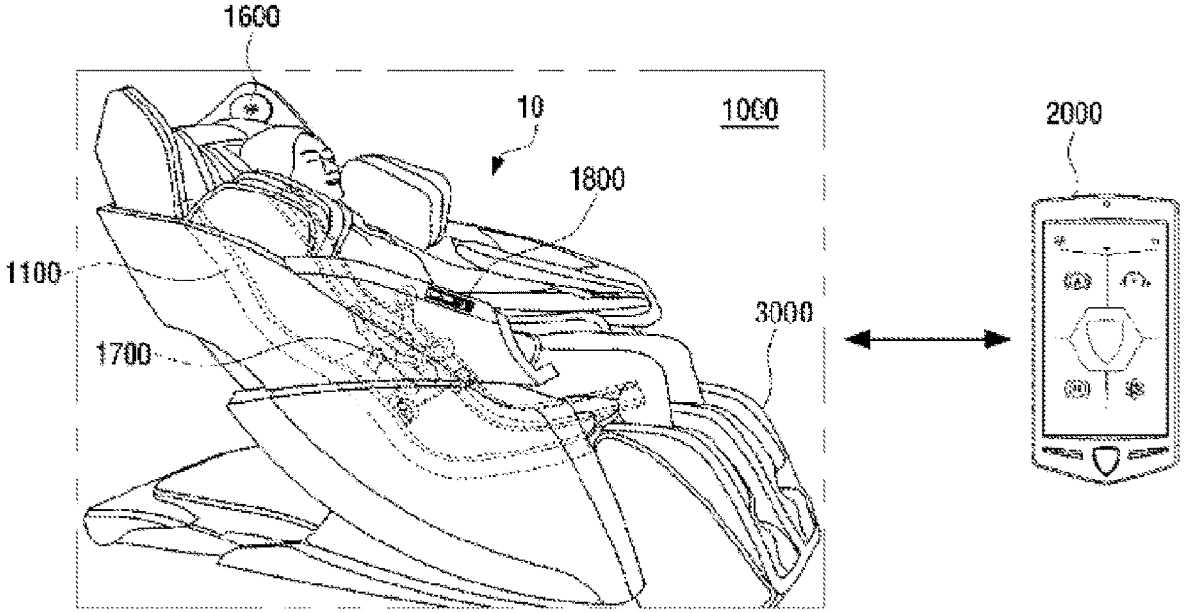

A massage module including a treatment member including an upper finger member and a lower finger member configured to cooperate with the upper finger member and a cam driving portion link-connected to the upper finger member and configured to vertically move the upper finger member and the lower finger member farther away from or closer to each other.

MODES OF THE INVENTION

The aspects, features, and advantages of the present disclosure will be more apparent from the following embodiment in relation to the attached drawings. The following particular structure and functional descriptions are exemplified to describe an embodiment according to the concept of the present disclosure. Embodiments according to the concept of the present disclosure may be implemented in a variety of shapes and should not be construed as being limited to the embodiments described in the specification or application.

Since a variety of modifications may be made in the embodiments according to the concept of the present disclosure and the embodiments may have a variety of shapes, particular embodiments will be illustrated in the drawings and described in detail in the specification or application. However, these are not intended to limit the embodiments according to the concept of the present disclosure to a particularly disclosed form and it should be understood that the embodiments according to the concept of the present disclosure include all changes, equivalents, and substitutes included within the concept and technical scope of the present disclosure.

The terms such as first, second, and/or the like may be used to describe a variety of components, and the components should not be limited to the terms. The terms are used only for distinguishing one component from another. For example, a first component may be referred to as a second component, and similarly, the second component may be referred to as the first component without departing from the scope of the concept of the present disclosure.

When it is stated that one component is “connected” or “joined” to another component, it should be understood that the one component may be directly connected or joined to the other component but still another component may be present therebetween. On the other hand, when it is stated that one component is “directly connected” or “directly joined” to another component, it should be understood that still another component is not present therebetween. Other expressions for describing a relationship between components, that is, “between,” “directly between,” “adjacent to,” “directly adjacent to,” and the like should also be equally construed.

The terms used herein are used merely for describing particular embodiments and are not intended to limit the present disclosure. Singular expressions, unless clearly defined otherwise in context, include plural expressions. Throughout the specification, the terms “comprise,” “have,” or the like are used herein to specify the presence of implemented features, numbers, stages, operations, elements, components or combinations thereof but do not preclude the presence or addition of one or more other features, numbers, stages, operations, elements, components, or combinations thereof.

Unless otherwise defined, all terms used herein including technical or scientific terms have the same meanings as those generally understood by one of ordinary skill in the art. The terms as defined in generally used dictionaries should be construed as having meanings which coincide with contextual meanings of related art and will not be understood as ideal or excessively formal meanings unless clearly defined.

In the specification, an actuator means a component capable of providing a driving force. For example, the actuator may include a motor, a linear motor, an electronic motor, a direct current (DC) motor, an alternating current (AC) motor, a linear actuator, an electric actuator, and the like but is not limited thereto.

In the specification, a spiral rod means a linear member having a spiral groove and may be implemented using a metal material. For example, the spiral may include a cylindrical bar having a spiral groove on a surface thereof. Also, the spiral rod may include a metal lead screw.

In the specification, a binaural beat may mean audio information having a particular form capable of adjusting a brainwave.

In the specification, according to one embodiment, a massage device may refer to a massage device including a body massage portion and a leg massage device. Also, according to another embodiment, a body massage portion 1000 and a leg massage portion 300 may exist as detached separate devices (for example, a body massage device and a leg massage device) and a massage device may refer to the body massage device or the leg massage device.

FIG. 1 is a view illustrating a massage device 10 according to one embodiment of the present disclosure.

The massage device 10 according to one embodiment of the present disclosure may include a body massage portion 1000 configured to form an area for accommodating at least a part of a body of a user and to massage the body of the user and a leg massage portion 3000 configured to massage legs of the user.

The body massage portion 1000 may provide a massage to at least a part of the body of the user The body massage portion 1000 may include a massage module 1700 configured to perform a massage function on at least a part of the body of the user, an audio output module 1600 configured to perform audio output having an arbitrary form toward the user, a main frame 110 configured to form a framework of the body massage portion 1000, and a user input portion 1800 configured to receive input having an arbitrary form from the user.

The above-described components included in the body massage portion 1000 are merely an exemplary embodiment, and the body massage portion 1000 may include a variety of components in addition to the above-described components.

Also, a shape and a structure of the massage device 10 shown in FIG. 1 are merely an example, and a variety of shapes of the massage device 10 may be included within the scope of the present disclosure without departing from the scope of the present disclosure which is defined by the claims.

The body massage portion 1000 may form a space having an arbitrary shape for accommodating the user. The body massage portion 1000 may include a space having a shape corresponding to a shape of the body of the user. For example, as shown in FIG. 1, the body massage portion 1000 may be implemented as a sitting type capable of accommodating an entirety or a part of the body of the user.

A part of the body massage portion 1000 which comes into contact with the ground may include an arbitrary material for increasing a frictional force or an arbitrary member (for example, a skid-proof pad and the like) for increasing a frictional force and may include wheels configured to reinforce mobility of the massage device 10.

At least a part of the body massage portion 1000 is slidable. For example, when the body massage portion 1000 starts massage, at least a part of the body massage portion 1000 is slidable forward. Also, the body massage portion 1000 may be tilted backward. As a result, the body massage portion 1000 may provide a massage while being titled backward.

According to one embodiment of the present disclosure, the massage device 10 may include at least one air cell (not shown). The air cells may be located at a shoulder part and a pelvic part of the user, an arm massage portion, the leg massage portion 3000, and the like but are not limited thereto and may be disposed in a variety of parts of the massage device 10.

The massage device 10 may include an air supply portion, and the air supply portion may supply air to the air cells so as to inflate the air cells. The air supply portion may be located inside the body massage portion 1000 and may be located in the leg massage portion 3000. Also, the air supply portion may be located outside the massage device 10.

The leg massage portion 3000 may provide the user with a leg massage.

For example, the leg massage portion 3000 may include a calf massage portion configured to massage calves of the user and/or a foot massage portion configured to massage feet of the user.

The leg massage portion 3000 may be adjustable in length according to physical features of the user. For example, when a tall user uses the massage device 10, since calves of the user are long, it is necessary to increase a length of the leg massage portion 3000. Also, when a short user uses the massage device 10, since calves of the user are short, it is necessary to decrease the length of the leg massage portion 3000. Accordingly, the leg massage portion 3000 may provide the user with a leg massage customized according to a height of the user.

The massage module 1700 may be provided inside the body massage portion 1000 so as to provide the user accommodated in the body massage portion 1000 with a dynamic stimulus having an arbitrary form. As shown in FIG. 1, the massage module 1700 may move along a main frame 1100 provided inside the body massage portion 1000.

For example, the main frame 1100 of the body massage portion 1000 may include a rack gear, and the massage module 1700 may provide dynamic stimuli to a variety of parts of the body of the user while moving along the rack gear. Particularly, the massage module 1700 may be implemented to have a human-hand shape and provide a sense of massage like kneading through retracting and spreading. The massage module 1700 performs front-rear movement and lateral movement and has a wide massage range so as to adjust a level of massage intensity. The massage module 1700 may include a ball massage unit or a roller massage unit but is not limited thereto.

The main frame 1100 forms a framework of an interior of the body massage portion 1000 and may be implemented using a metal material, a plastic material, or the like. For example, the main frame 1100 may be implemented using iron, an alloy, steel, or the like but is not limited thereto and may be implemented using a variety of hard materials.

According to one embodiment of the present disclosure, the massage device 10 may include the audio output module 1600. The audio output module 1600 may be provided in a variety of positions. For example, the audio output module 1600 may include a plurality of output units such as a top end audio output unit disposed at a top end of a seat portion which comes into contact with the user, front audio output units attached to front ends of left and right arm massage portions of the seat portion, and/or rear audio output units attached to rear ends of the arm massage portions but is not limited thereto. In this case, the audio output module 1600 may provide a stereophonic sound such as 5.1 channel sound but is not limited thereto.

According to one embodiment of the present disclosure, the user may control the massage device 10 using a massage device control device 2000. The massage device control device 2000 may be connected to the massage device 10 through wired communication and/or wireless communication.

The massage device control device 2000 may include a remote controller, a cellular phone, personal digital assistant (PDA), and the like but is not limited thereto and may include a variety of electronic devices capable of being connected to the massage device 10 through wired or wireless communication.

Figure 2:
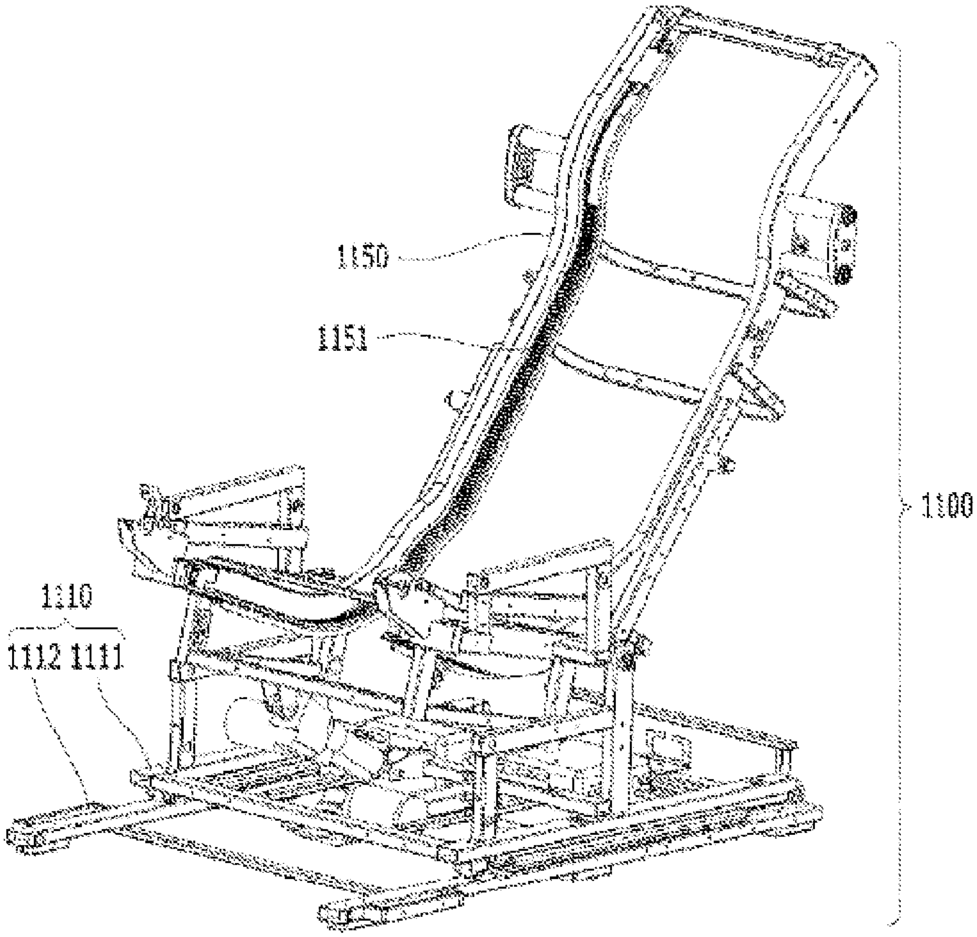

FIG. 2 is a view illustrating the main frame according to one embodiment of the present disclosure.

According to one embodiment of the present disclosure, the main frame 1100 may include an upper frame 1150 on which the massage module 1700 is provided and a base frame 1110 configured to support the upper frame 1150.

A rack gear 1151 may be provided on at least a part of the upper frame 1150. The rack gear 1151 is a member configured to guide vertical movement of the body massage module 1700 and may include a plurality of valley portions and a plurality of ridge portions.

According to one embodiment of the present disclosure, the rack gears 1151 may be provided on both sides of the upper frame 1150 to face each other, and the body massage module 1700 may move along the rack gear 1151.

For example, the body massage module 1700 may include a gear to be engaged with the rack gear 1151. The gear is rotated by an actuator provided in the body massage module 1700 so that the body massage module 1700 may move upward or downward.

The rack gear 1151 may be implemented using a metal material or a plastic material. For example, the rack gear 1151 may be implemented using iron, steel, an alloy, reinforced plastics, a melamine resin, a phenolic resin, and the like but is not limited thereto.

The upper frame 1150 may have a variety of shapes. For example, the upper frame 1150 may be divided, according to a shape, into an S frame, an L frame, an S&L frame, and a double S&L frame but is not limited thereto.

The S frame means a frame of the upper frame 1150, which includes a shape at least partially curved like the letter S. The L frame means a frame of the upper frame 1150, which includes a shape at least partially bent like the letter L. The S&L frame means a frame which includes both the shape curved like the letter S and the shape bent like the letter L. The double S&L frame means a frame including a part bent like the letter L and two parts curved like the letter S.

The base frame 1110 means a part which supports the upper frame 1150 of the main frame 1100 and comes into contact with the ground. The base frame 1110 may include an upper base frame 1111 and a lower base frame 1112.

The upper base frame 1111 may support the upper frame 1150, and the lower base frame 1112 may come into contact with the ground. Also, the upper base frame 1111 may be located to come into contact with the lower base frame 1112.

According to one embodiment of the present disclosure, the upper base frame 1111 may move along the lower base frame 1112. For example, upper base frame 1111 may slide forward or backward along the lower base frame 1112. In this case, the upper frame 1150 may be connected to the upper base frame 1111 and move according to movement of the upper base frame 1111.

For example, when the upper base frame 1111 moves forward, the upper frame 1150 may also move forward. When the upper base frame 1111 moves backward, the upper frame 1150 may also move backward. Accordingly, the body massage portion 1000 may be allowed to be slidable.

In detail, to allow the upper base frame 1111 to move, a moving wheel may be provided below the upper base frame 1111. Also, a guide member capable of guiding the moving wheel may be provided above the lower base frame 1112. The moving wheel provided at the upper base frame 1111 may move along the guide member provided at the lower base frame 1112 so as to allow the upper base frame 1111 to move forward or backward.

According to another embodiment of the present disclosure, the massage device 10 may not provide a sliding function. In this case, the base frame 1110 may not be separated into upper and lower frames.

Figure 3:
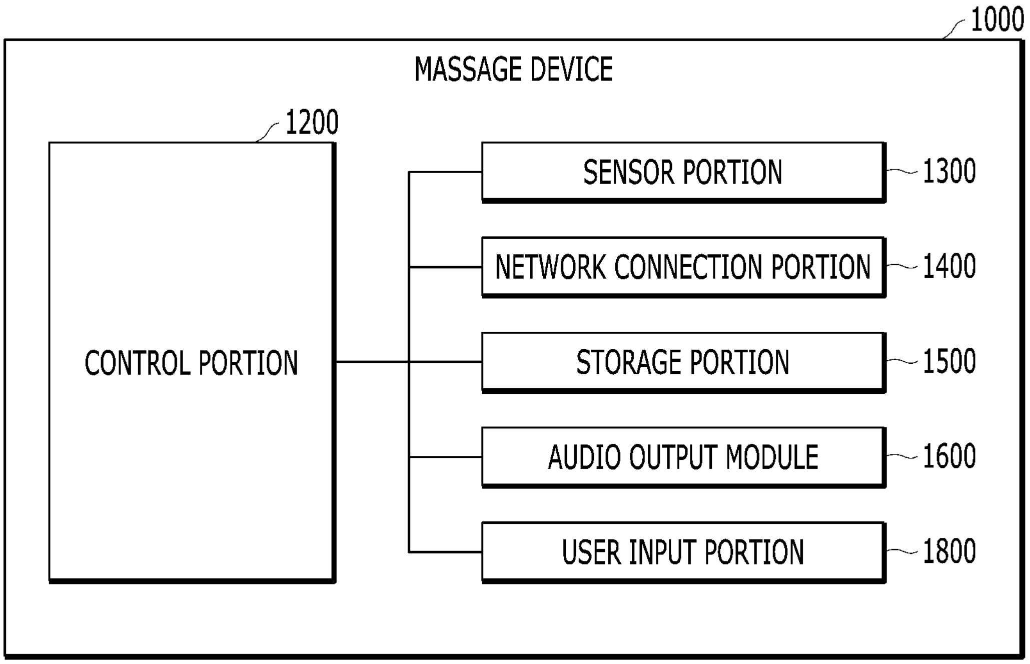

FIG. 3 is a view illustrating components of the massage device 10 according to one embodiment of the present disclosure.

According to one embodiment of the present disclosure, the massage device 10 may include at least one of a control portion 1200, a sensor portion 1300, the user input portion 1800, an audio output module 1600, and a network connection portion 1400.

The control portion 1200 may control operations of the massage device 10. The control portion 1200 may be implemented using one processor or be implemented using a plurality of processors. When the control portion 1200 is implemented using a plurality of processors, at least some of the plurality of processors may be located at a physically spaced distance. Also, the control portion 1200 is not limited thereto and may be implemented using a variety of methods.

According to on embodiment of the present disclosure, the control portion 1200 may control operations of the massage device 10. For example, the massage device 10 may include a plurality of actuators, and the operations of the massage device 10 may be controlled by controlling operations of the plurality of actuators. For example, the massage device 10 may include at least one of an actuator configured to move the massage module 1700, at least one actuator included in the massage module, a back angle actuator, a leg angle actuator, a foot massage actuator, a leg length adjustment actuator, and a sliding actuator. The control portion 1200 may control the operations of the massage device 10 by controlling the same.

The actuator configured to move the massage module is an actuator configured to allow the massage module 1700 to move vertically. The massage module 1700 may move along the rack gear due to an operation of the actuator configured to move the massage module 1700.

The back angle actuator is an actuator configured to adjust an angle of a part of the massage device 10 which comes into contact with the back of the user. A back angle of the massage device 10 may be adjusted by an operation of the back angle actuator.

The leg angle actuator is an actuator configured to adjust an angle of the leg massage portion 3000 of the massage device 10. An angle between the leg massage portion 3000 and the body massage portion 1000 may be adjusted by an operation of the leg angle actuator.

The foot massage actuator refers to an actuator configured to operate the foot massage module included in the leg massage portion 3000. The massage device 10 may provide the user with a foot massage utilizing the foot massage actuator.

The massage module 1700 may include at least one actuator, and the control portion 1200 may provide a variety of massage operations by operating the at least one actuator. For example, the control portion 1200 may provide a beating massage, a kneading massage, and the like by operating the at least one actuator included in the massage module 1700 but is not limited thereto and may provide a variety of massage operations.

The leg length adjustment actuator refers to an actuator configured to adjust a length of the leg massage portion 3000. For example, the control portion 1200 may adjust the length of the leg massage portion 3000 according to the user by utilizing the leg length adjustment actuator so that the user may receive a massage adequate for his or her body shape.

The sliding actuator enables a sliding operation of the massage device 10. For example, a horizontal upper base frame 1114*a* may move forward or backward due to an operation of the sliding actuator so that the upper frame connected to the horizontal upper base frame 1114*a* may also move forward or backward.

The sensor portion 1300 may obtain a variety of pieces of information using at least one sensor. For example, the sensor may include a pressure sensor, an infrared sensor, a light emitting diode (LED) sensor, and the like.

Also, the sensor portion 1300 may include a biometrics obtaining sensor. The biometrics obtaining sensor may obtain fingerprint information, face information, voice information, iris information, weight information, electrocardiogram information, and the like but is not limited thereto and may include a variety of pieces of biometric information.

According to another embodiment of the present disclosure, the massage device 10 may sense a contact area and/or a contact position with the user using the sensors. Also, the massage device 10 may obtain shoulder position information of the user through the sensor portion 1300. Also, the massage device 10 may provide a customized massage based on the obtained information. For example, when the massage device 10 provides a shoulder massage, the massage device 10 may recognize the shoulder position of the user on the basis of the information obtained using the sensor portion 1300 and provide the user with a shoulder massage according to a recognition result.

The user input portion 1800 may receive a command related to controlling the operation of the massage device 10 from the user, and the user input portion 1800 may be implemented to have a variety of forms. For example, the user input portion 1800 may be provided in the body massage portion 1000 and provided in the leg massage portion 3000 but is not limited thereto.

The massage device 10 may obtain a variety of commands from the user through the user input portion 1800. For example, the massage device 10 may receive an arbitrary command related to a selection of the massage module, a selection of a massage type, a selection of a level of massage intensity, a selection of massage time, a selection of a massage part, a selection of a position and an operation of the body massage portion 1000 a selection with respect to turning power of the massage device 10 on and off, a selection with respect to whether a warming function is performed, a selection related to reproducing a sound source, and the like but is not limited thereto.

According to another embodiment of the present disclosure, the user input portion 1800 may include hot-key type buttons, a selection button for implementing a selection, cancellation, or input of direction, and/or the like according to a preset user setting function, an autonomously preset function, or the like.

The user input portion 1800 may be implemented using a key pad, a dome switch, a touch pad (static pressure/static electricity), a jog wheel, a jog switch, and the like but is not limited thereto. Also, the user input portion 1800 may obtain a command through an utterance of the user on the basis of a voice recognition art.

According to one embodiment of the present disclosure, the user input portion 1800 may include a display configured to display an operation state of the massage device 10, a current state of the user, or the like. In this case, the display may include at least one of a liquid crystal display (LCD), a thin film transistor LCD (TFT LCD), an organic light emitting diode (OLED), a flexible display, and a three-dimensional (3D) display but is not limited thereto.

The audio output module 1600 may output arbitrary-form audio to the user. For example, the audio output module 1600 may stimulate the brain of the user by outputting a sound source and/or a binaural beat optimized to a massage pattern provided by the massage device 10. The audio output module 1600 may output a voice signal which is received through a network (not shown) or stored in an internal/external storage medium (not shown). For example, the audio output module 1600 may output the sound source under control of a user terminal 2000 through network connection (for example, Bluetooth® (a short-range wireless technology standard) connection and the like) with the user terminal 2000. Also, the audio output module 1600 may output an arbitrary-form sound signal generated in relation to the operation of the massage device 10.

The massage device 10 according to one embodiment of the present disclosure may include the network connection portion 1400. The network connection portion 1400 may perform communication with the modules inside the massage device 10, an external massage device, and/or the user terminal 2000 through an arbitrary-form network. The network connection portion 1400 may include a wired/wireless connection module for network connection. As a wireless connection art, for example, wireless local area network (WLAN), Wi-Fi, wireless broadband (Wibro), world interoperability for microwave access (WiMAX), high speed downlink packet access (HSDPA), and the like may be used. As wired connection art, for example, x digital subscriber line (xDSL), fibers to the home (FTTH), power line communication (PLC), and the like may be used. Also, the network connection portion may include a short-range communication module so as to transmit or receive data with an arbitrary device/terminal located at a short distance. For example, as a short range communication art, Bluetooth® (a short-range wireless technology standard), radio frequency identification (RFID), infrared data association (IrDA), ultra wideband (UWB), ZigBee® (wireless mesh network standard), and the like may be used but the present disclosure is not limited thereto.

A storage portion 1500 may store a variety of pieces of information related to the massage device 10. For example, the storage portion 1500 may include massage control information and include personal authentication information but is not limited thereto.

The storage portion 1500 may be implemented using a non-volatile storage medium capable of continuously storing arbitrary data. For example, the storage portion 1500 may include not only a disc, an optical disk, and a magneto-optical storage device but also a flash memory and/or a storage device based on a battery-backup memory but is not limited thereto.

Also, the storage portion 1500 may include a memory. The memory is a main storage device like a random access memory (RAM) such as a dynamic RAM (DRAM), a static RAM (SRAM), and the like, which is directly accessed by a processor and may mean a volatile storage device in which stored information is instantaneously erased when power is turned off but is not limited thereto. The memory may be operated by the control portion 1200.

Hereinafter, the massage module 1700 shown in FIG. 1 will be described in detail.

Figure 4:
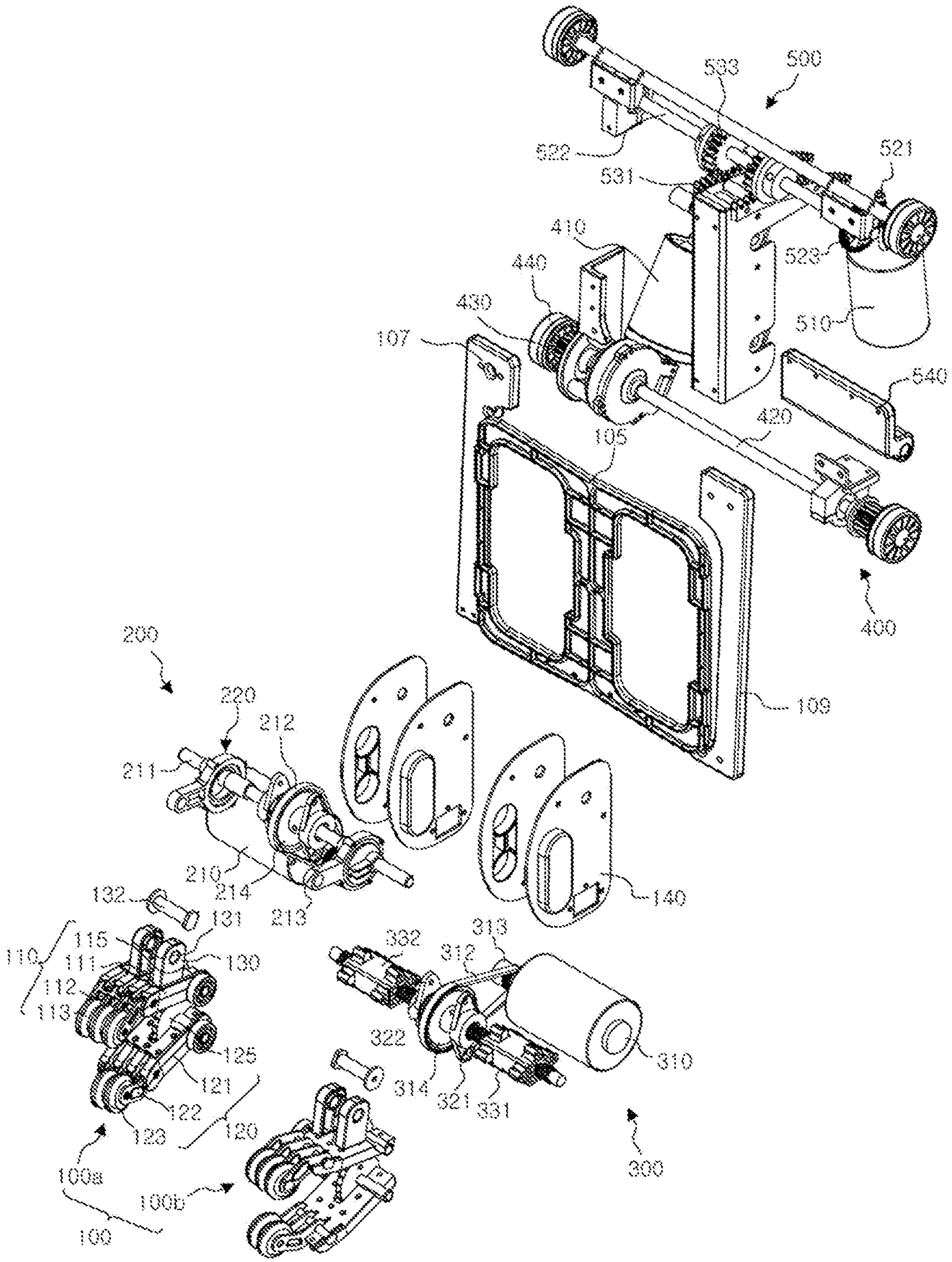

FIG. 4 is an exploded perspective view of the massage module according to one embodiment of the present disclosure.

Referring to FIG. 4, the massage module 1700 may include a treatment member 100 configured to perform a massage, a treatment member housing 140 configured to accommodate at least a part of the treatment member 100, a main bracket 105 in which the treatment member housing 140 is installed, and brackets 107 and 109 configured to support both sides of the main bracket 105.

The treatment member 100 may be provided as a pair of a first treatment member 100*a* and a second treatment member 100*b*, but unlike that which is shown in the drawing, may be singularly provided or may be provided as being mounted on only one of the first treatment member 100*a* and the second treatment member 100*b*. However, for convenience of description, hereinafter, a state in which both the first treatment member 100*a* and the second treatment member 100*b* are mounted will be described as an example. The first treatment member 100*a* and the second treatment member 100*b* may each include an upper finger member 110, a lower finger member 120, and a cam link 130.

The upper finger member 110 may include an upper finger gear 115, and the lower finger member 120 may include a lower finger gear 125 engaged with the upper finger gear 115 and inversely rotated. The upper finger member 110 and the lower finger member 120 may each include a finger housing 111 or 121, a finger bracket 112 or 122 installed in the finger housing 111 or 121, and a massage roller 113 or 123 rotatably installed on the finger bracket 112 or 122. The cam link 130 may be installed in an upper finger housing 111, and a cam shaft insertion hole 131 configured to allow a cam shaft 132 to be inserted may be formed therein.

The massage module 1700 may further include a cam driving portion 200 configured to allow the upper finger member 110 and the lower finger member 120 to be away from or close to each other.

The cam driving portion 200 may include a cam driving motor 210 configured to generate a rotational force, a kneading shaft 211 connected to a driving shaft of the cam driving motor 210, and a cam unit 220 eccentrically rotated about the kneading shaft 211. The cam driving portion 200 may further include a small kneading pulley 213, a large kneading pulley 214, and a kneading belt 212 as components configured to connect the cam driving motor 210 to the kneading shaft 211.

The cam unit 220 may be connected to the upper finger member 110 by the cam link 130 using a pin method. The cam link 130 may be adjusted in vertical movement and an angle with the cam unit 220 due to eccentric rotation of the cam unit 220 so that the upper finger member 110 may move vertically. Simultaneously, the lower finger member 120 may cooperate with the upper finger member 110 and move in an opposite direction so as to be away from or close to the upper finger member 110. Driving mechanisms of the cam driving portion 200 will be described in detail with reference to FIGS. 7 to 9B.

The massage module 1700 may further include a lateral driving portion 300 configured to allow the pair of treatment members 100*a* and 100*b* to be away from or close to each other.

The lateral driving portion 300 may include left and right driving motors 310 configured to generate a rotational force, two rotational shafts 321 and 322 connected to driving shafts of the left and right driving motors 310, and two rotational shaft housings 331 and 332 formed to be engaged with the two rotational shafts 321 and 322, respectively. The lateral driving portion 300 may further include a small lateral driving pulley 313, a large lateral driving pulley 314, and a lateral driving belt 312 as components configured to connect the left and right driving motors 310 to the two rotational shafts 321 and 322. The two rotational shaft housings 331 and 332 may be installed on rear surfaces of the pair of treatment members 100*a* and 100*b*, respectively.

The two rotational shaft housings 331 and 332 may move leftward or rightward as the two rotational shafts 321 and 322 are inserted by rotation of the left and right driving motors 310. The two rotational shafts 321 and 322 may include screws formed in mutually opposite directions. Accordingly, the two rotational shaft housings 331 and 332 may move in mutually opposite directions so that the pair of treatment members 100*a* and 100*b* may be away from or close to each other. Driving mechanisms of the lateral driving portion 300 will be described in detail with reference to FIG. 10.

The massage module 1700 may further include a vertical driving portion 400 configured to vertically move the massage module 1700.

The vertical driving portion 400 may include a vertical driving motor 410 configured to generate a rotational force, a vertical movement shaft 420 connected to a driving shaft of the vertical driving motor 410, a vertical movement pinion gear 430 installed on the vertical movement shaft 420, and a vertical movement roller 440.

The vertical driving portion 400 may be installed on an external vertical movement rack gear by the vertical movement pinion gear 430. Accordingly, the vertical driving portion 400 may move along the external vertical movement rack gear. Driving mechanisms of the vertical driving portion 400 will be described in detail with reference to FIG. 11.

The massage module 1700 may further include a front-rear driving portion 500 configured to linearly move the massage module 1700 in a front-rear direction.

The front-rear driving portion 500 may include a front-rear driving motor 510 configured to generate a rotational force, a front-rear driving motor screw 521 connected to a driving shaft of the front-rear driving motor 510, a front-rear movement shaft 522 formed in a direction intersecting the front-rear driving motor screw 521, and a direction switching gear 523 rotated while being engaged with the front-rear driving motor screw 521 and configured to switch and transmit a rotation direction of the front-rear driving motor screw 521 to the front-rear movement shaft 522.

The front-rear driving portion 500 may further include a front-rear movement rack gear 531 formed on a rear surface of the main bracket 105 and a front-rear movement pinion gear 533 inserted into the front-rear movement shaft 522. The front-rear driving portion 500 may further include a front-rear movement bracket 540 installed at a bottom end of the main bracket 105 and into which the vertical movement shaft 420 is inserted.

The front-rear movement pinion gear 533 may be rotated by rotation of the front-rear movement shaft 522 and move while being engaged with the front-rear movement rack gear 531. Accordingly, the main bracket 105 may move with the vertical movement shaft 420 as a reference shaft in a front-rear direction. Driving mechanisms of the front-rear driving portion 500 will be described in detail with reference to FIGS. 9A to 10.

Hereinafter, referring to FIGS. 5 and 6, the treatment member 100 shown in FIG. 4 will be described in detail. The treatment member 100 may be provided as the pair of the first treatment member 100*a* and the second treatment member 100*b* as described above.

Figure 5:
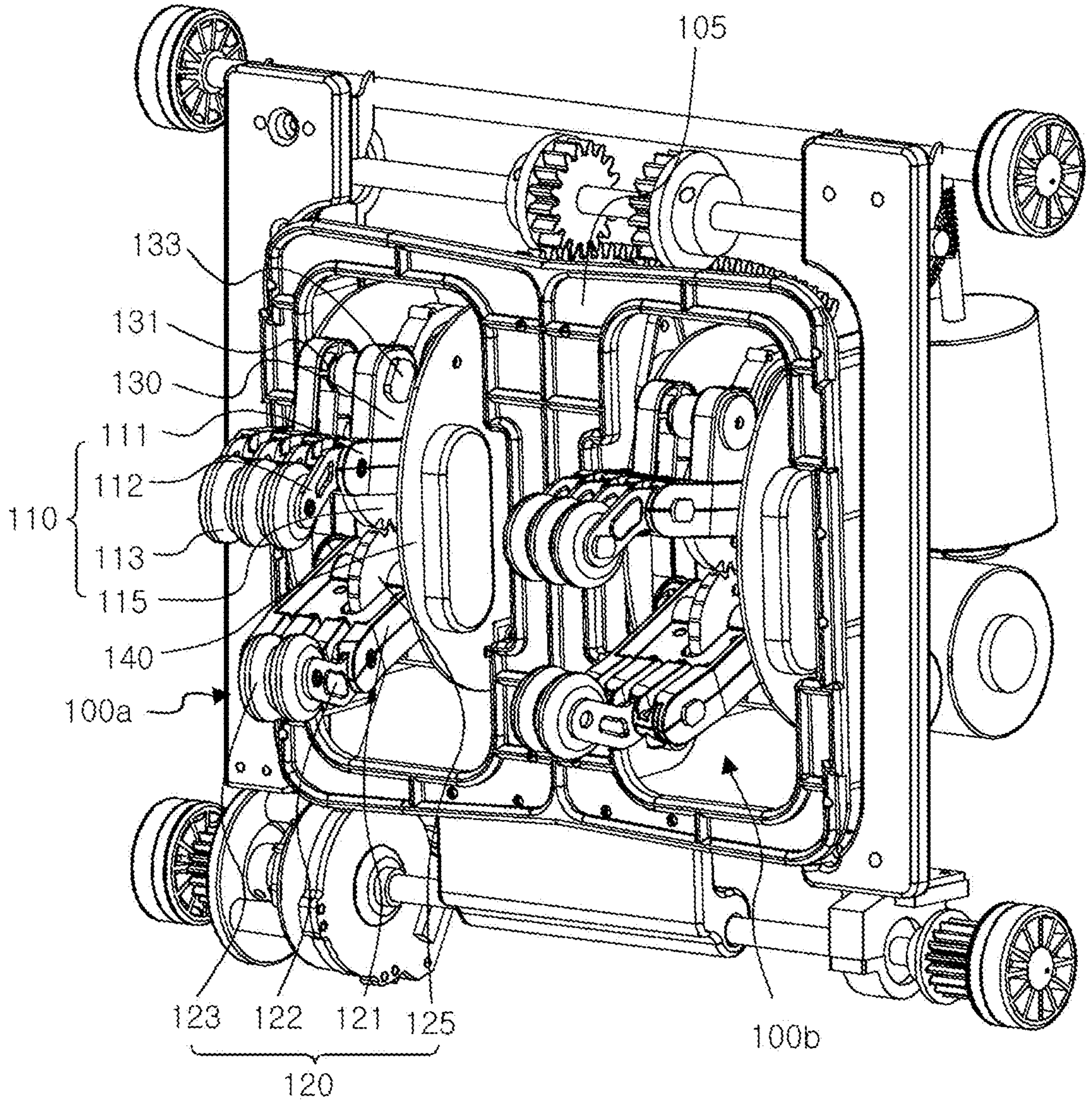

FIG. 5 is a perspective view of the massage module according to one embodiment of the present invention.

Referring to FIG. 5, the first treatment member 100*a* and the second treatment member 100*b* may each include the upper finger member 110 and the lower finger member 120 so as to implement a human-hand shape. The first treatment member 100*a* and the second treatment member 100*b* may be at least partially accommodated in the treatment member housing 140. The first treatment member 100*a* and the second treatment member 100*b* may each be mounted on the main bracket 105 by the treatment member housing 140.

The upper finger member 110 may include the upper finger housing 111, the upper finger bracket 112, an upper finger massage roller 113, and the upper finger gear 115.

The upper finger housing 111 may provide an installation space in which the cam link 130, which will be described below, is installed. The upper finger bracket 112 may be installed on a front end of the upper finger housing 111. The upper finger bracket 112 may be installed or formed to meet the upper finger housing 111 at a certain angle. The upper finger bracket 112 may be installed at the front end of the upper finger housing 111 to be tilted downward so as to meet the upper finger housing 111 at a certain angle. Otherwise, the upper finger bracket 112 itself may be provided to have a bent shape so as to meet the upper finger housing 11 at a certain angle therebelow when being installed at the front end of the upper finger housing 111. The upper finger bracket 112 may include a plurality of arms on which such upper finger massage rollers 113 may be installed. The upper finger massage roller 113 may be disposed in a space between the plurality of arms of the upper finger bracket 112, and each of the upper finger massage rollers 112 may be coupled to and supported by the arms located on both sides thereof.

The upper finger massage roller 113 may be rotatably installed on the upper finger bracket 112. The upper finger massage roller 113 is a part configured to pressurize the body of the user and is not limited in shape and may include an uneven part, protrusion, or the like so as to increase a massage effect.

Although three upper finger massage rollers 113 may be linearly installed on the upper finger bracket 112 as shown in FIG. 5, there are no limitations in installation shape and number thereof. The upper finger gear 115 may be installed on a rear end of the upper finger housing 111. The upper finger gear 115 may rotate corresponding to vertical movement of the upper finger housing 111 by the cam driving portion 200 which will be described below.

The lower finger member 120 may include a lower finger housing 121, a lower finger bracket 122, a lower finger massage roller 123, and the lower finger gear 125.

The lower finger bracket 122 may be installed on a front end of the lower finger housing 121. The lower finger bracket 122 may be installed or formed to meet the lower finger housing 121 at a certain angle. The lower finger bracket 122 may be installed at the front end of the lower finger housing 121 to be tilted upward so as to meet the upper finger housing 121 at a certain angle. Otherwise, the lower finger bracket 122 itself may be provided to have a bent shape so as to meet the lower finger housing 121 at a certain angle thereabove when being installed at the front end of the lower finger housing 121. The lower finger bracket 122 may include a plurality of arms on which such lower finger massage rollers 123 may be installed. The lower finger massage roller 123 may be disposed in a space between the plurality of arms of the lower finger bracket 122, and each of the lower finger massage rollers 122 may be coupled to and supported by the arms located on both sides thereof. The lower finger massage roller 123 may be rotatably installed on the lower finger bracket 122. The lower finger massage roller 123 is a part configured to pressurize the body of the user and is not limited in shape and may include an uneven part, protrusion, or the like so as to increase a massage effect. Although two lower finger massage rollers 123 may be linearly installed on the lower finger bracket 122 as shown in FIG. 3, there are no limitations in installation shape and number.

The lower finger bracket 125 may be installed on a rear end of the lower finger housing 121. The lower finger gear 125 may be formed to come into contact with the upper finger gear 115. The lower finger gear 125 and the upper finger gear 115 may be gear-coupled to each other so as to rotate in mutually opposite directions. The lower finger gear 125 transmits a rotational force to the lower finger housing 121 in a direction opposite to a rotational direction of the upper finger gear 115 so as to allow the lower finger housing 121 to move vertically.

The cam link 130 may link-connect the upper finger member 110 to the cam driving portion 200 which will be described below. In detail, the cam shaft insertion hole 131 may be formed in one side of the cam link 130. The cam link 130 may be connected to the cam driving portion 200 by the cam shaft 132 inserted into the cam shaft insertion hole 131 using a pin method. For example, two cam links 130 may be provided, and the cam shaft 132 may be inserted into the cam shaft insertion hole 131 in a state in which a cam cover 222, which will be described below, is located between the two cam links 130. The cam shaft 132 may be fastened and assembled with a washer 133 while being inserted into the cam shaft insertion hole 131. The other side of the cam link 130 may be accommodated in the upper finger housing 111. The cam link 130 may be fixedly coupled to the rear end of the upper finger housing 111.

Figure 6:
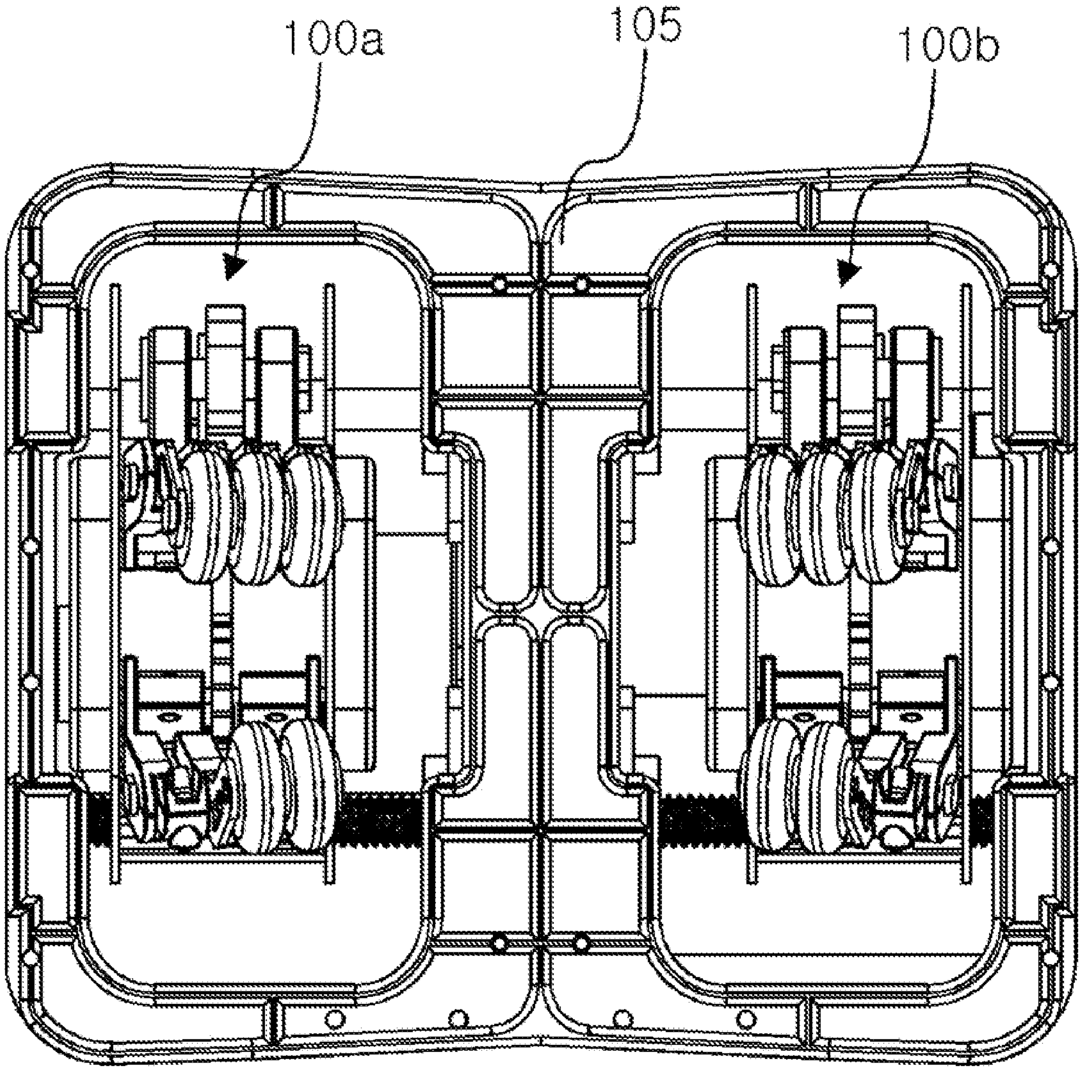

FIG. 6 is a front view of the massage module according to one embodiment of the present invention.

Referring to FIG. 6, the treatment member 100 may be provided as the pair of the first treatment member 100*a* and the second treatment member 100*b*. The first treatment member 100*a* and the second treatment member 100*b* may be disposed as one pair on left and right sides of the main bracket 105 and installed to be tilted at a certain angle toward a center. For example, the first treatment member 100*a* and the second treatment member 100*b* may be installed on the main bracket 105 while being tilted toward the center of the main bracket 105 in order to form a tilt of about 10 degrees with a vertical shaft of the main bracket 105.

Hereinafter, the cam driving portion 200 and driving mechanisms of the cam driving portion 200 will be described in detail with reference to FIGS. 7 to 9B.

Figure 7:
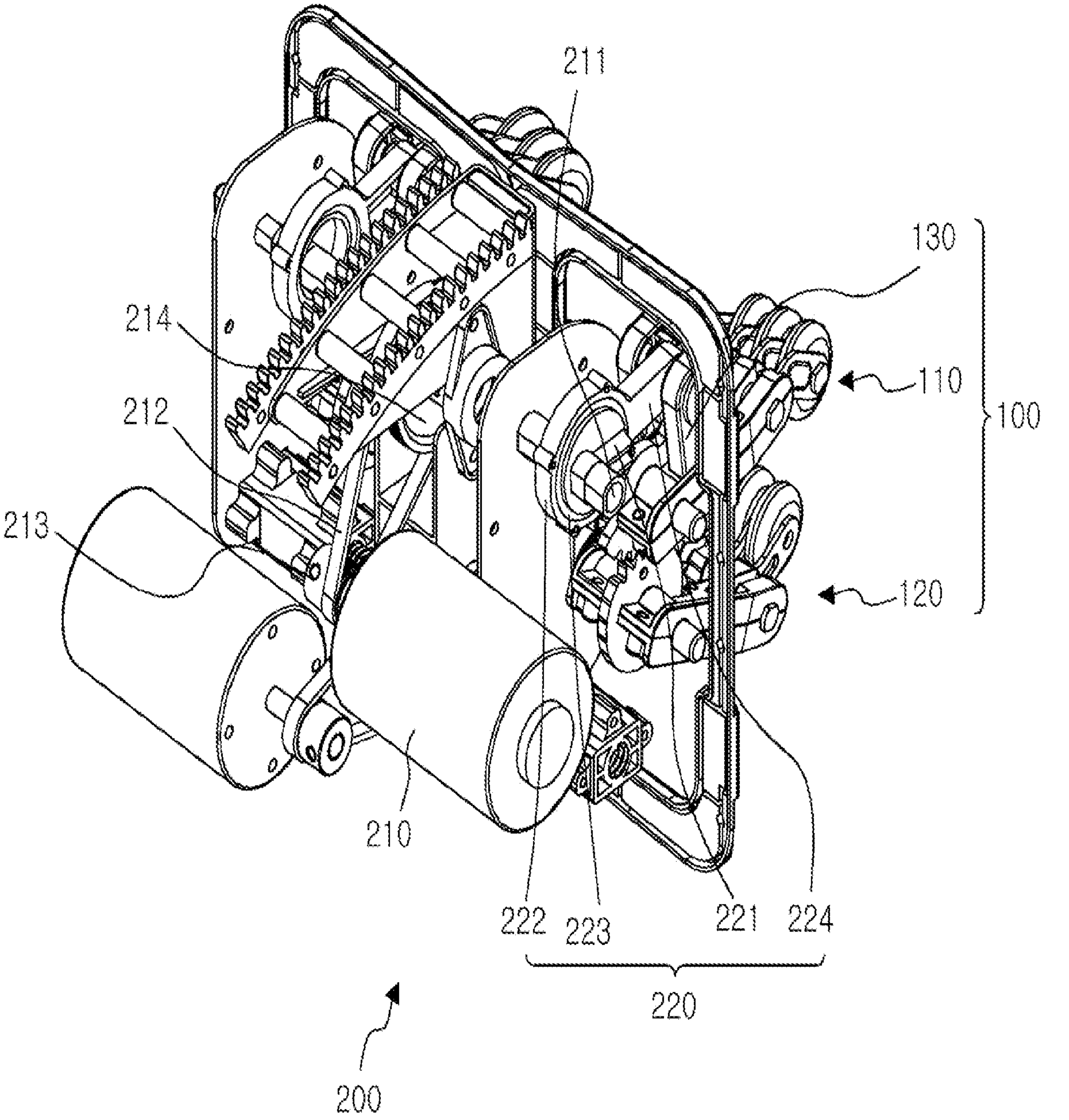

FIG. 7 is an enlarged view illustrating the cam driving portion included in the massage module according to one embodiment of the present invention. However, for convenience of description, the treatment member 100 is also illustrated.

Referring to FIG. 7, the cam driving portion 200 may include the cam driving motor 210, the kneading shaft 211, and the cam unit 220. The cam driving portion 200 may further include the small kneading pulley 213, the large kneading pulley 214, and the kneading belt 212 as components configured to connect the cam driving motor 210 to the kneading shaft 211.

The cam driving motor 210 is a driving power source of the cam driving portion 200 and may generate a rotational force.

The kneading shaft 211 may receive rotational power of the cam driving motor 210. The rotational power of the cam driving motor 210 may be transmitted to the kneading shaft 211 by the kneading belt 212 which binds the small kneading pulley 213 mounted on the cam driving motor 210 and the large kneading pulley 214 mounted on the kneading shaft 211. Accordingly, the kneading shaft 211 may rotate corresponding to driving of the cam driving motor 210.

The cam unit 220 may be connected to the kneading shaft 211 and eccentrically rotate on the kneading shaft 211 corresponding to rotation of the kneading shaft 211. In detail, the cam unit 220 may include an unbalanced cover 221 connected to the kneading shaft 211 and a cam cover 222 on which the unbalanced cover 221 fits and to which the unbalanced cover 221 is coupled. A cam bearing 223 may be inserted between the unbalanced cover 221 and the cam cover 222. The cam bearing 223 may perform a function of preventing a load, vibrations, noise, or the like generated when the cam unit 220 rotates. A cam cover protruding portion 224 may be formed to extend from one side of the cam cover 222. The cam cover protruding portion 224 may be located between the cam links 130 and may be connected to the cam link 130 through insertion of the cam shaft 132 using a pin method. For example, a through hole may be formed in the cam cover protruding portion 224 to correspond to a size and a shape of the cam shaft insertion hole 131. The cam shaft 132 may be inserted into the cam cover protruding portion 224 while being located between the cam links 130 so that the through hole corresponds to a position of the cam link insertion hole 131. The cam shaft 132 is inserted through the through hole formed in the cam cover protruding portion 224 and the cam link insertion hole 131 so that the cam cover 222 and the cam link 130 may form a pin type connection structure. Also, the cam unit 220 may be link-connected to the upper finger member 110 by the cam shaft 132 inserted into the cam cover protruding portion 224 and the cam link 130. The cam unit 220 may be adjusted in angle with the cam link 130 while eccentrically rotating and may induce vertical movement of the upper finger member 110 fixedly coupled to the cam link 130.

Although the cam driving motor 210 rotates in one direction due to the eccentric rotation of the cam unit 220, the upper finger member 110 may move vertically and the lower finger member 120 may move in a direction opposite that of the upper finger member 110 at the same time. Accordingly, the upper finger member 110 and the lower finger member 120 may perform a retraction operation of being close to each other or a spreading operation of being away from each other. In relation thereto, the present disclosure will be described with reference to FIGS. 8A to 9B.

Figure 8A:
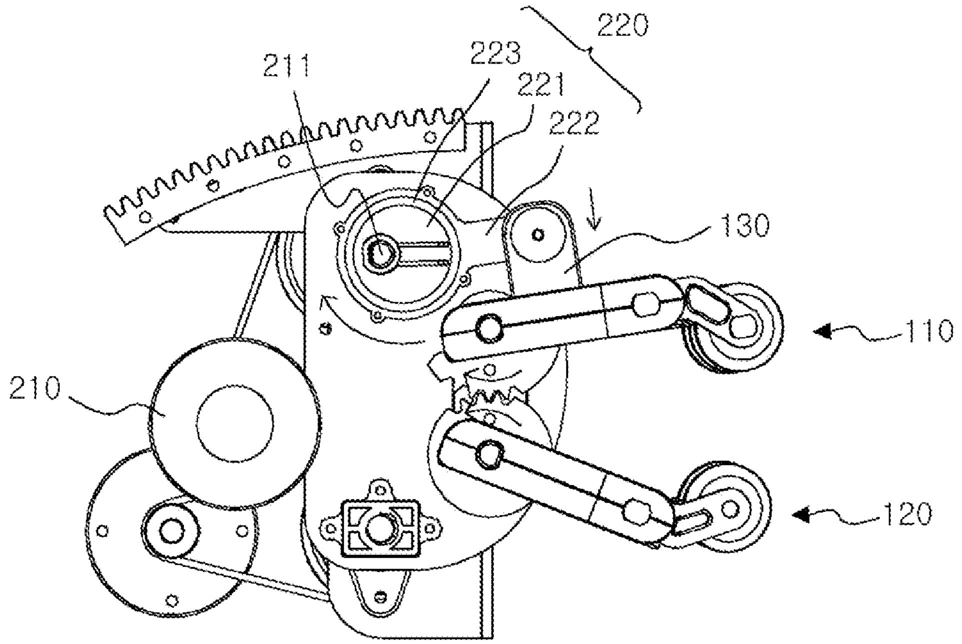
Figure 8B:
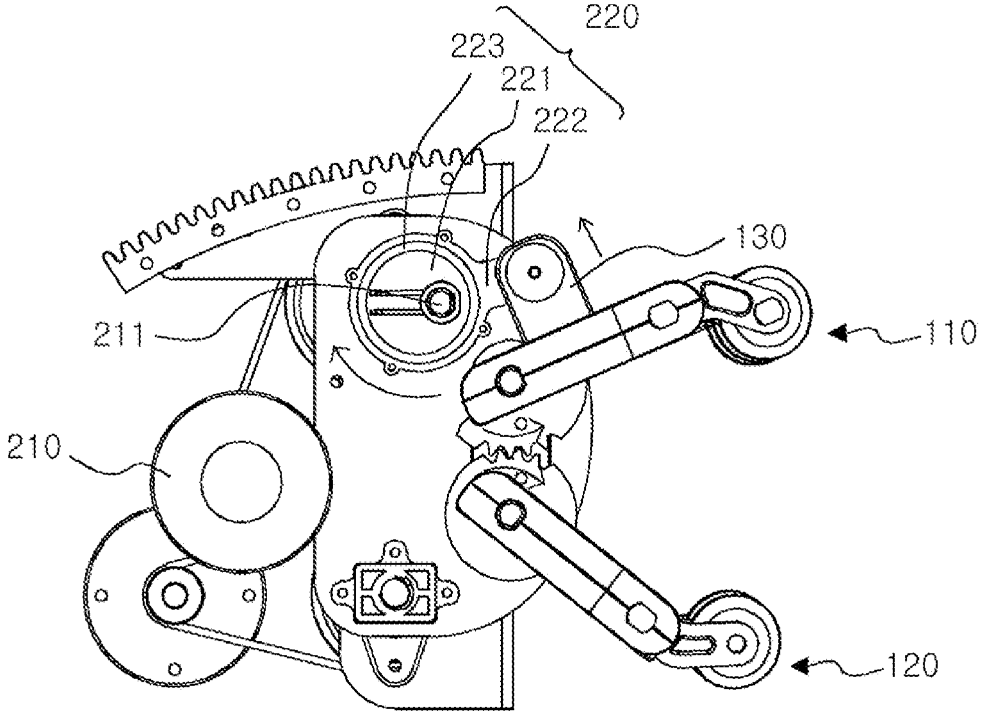

FIGS. 8A and 8B are views illustrating driving mechanisms of the cam driving portion included in the massage module according to one embodiment of the present invention. FIGS. 6A and 6B are views illustrating the cam driving portion shown in FIG. 5 when viewed from the side and illustrate the treatment member 100 for convenience of description.

Referring to FIG. 8A, the upper finger member 110 and the lower finger member 120 may perform the retraction operation. When the kneading shaft 211 rotates corresponding to driving of the cam driving motor 210, the cam unit 220 may eccentrically rotate on the kneading shaft 211 and the cam link 130 may move downward as well as being adjusted in angle with the cam unit 220. As the upper finger housing 111 moves downward corresponding to movement of the cam link 130, the upper finger gear 115 may rotate in a first direction (for example, a clockwise direction). Simultaneously, the lower finger gear 125 may rotate in a second direction opposite to the first direction (for example, a counterclockwise direction). Accordingly, the lower finger housing 121 may receive a rotational force from the lower finger gear 125 and move upward so as to perform the retraction operation of being close to the upper finger housing 111.

Referring to FIG. 8B, the upper finger member 110 and the lower finger member 120 may perform the spreading operation. Mechanisms of implementing the spreading operation are the same as that of the retraction operation. The cam driving motor 210 may rotate in one direction while the spreading operation and the retraction operation are implemented. When the kneading shaft 211 rotates corresponding to driving of the cam driving motor 210, the cam unit 220 may eccentrically rotate on the kneading shaft 211. For example, when the cam unit 220 rotates halfway from a state shown in FIG. 8A, the state changes to a state shown in FIG. 8B. According to the halfway rotation of the cam unit 220, the cam link 130 may be adjusted in angle with the cam unit 220 and move upward at the same time.

Simultaneously, as the upper finger housing 111 moves upward, the upper finger gear 115 may move in the second direction and the lower finger gear 125 may rotate in the first direction opposite to the second direction. Accordingly, the lower finger housing 121 may receive a rotational force from the lower finger gear 125 and move downward so as to perform the spreading operation of being away from the upper finger housing 111.

As described above, the massage module 1700 according to one embodiment of the present invention may rotate the cam driving motor 210 in one direction so as to repetitively perform the retraction operation and the spreading operation using the upper finger gear 115 and the lower finger gear 125. Here, rotational sections of the upper finger gear 115 and the lower finger gear 125 may be predetermined within a certain range in design. Accordingly, the upper finger member 110 and the lower finger member 120 may be limited in vertical mobile displacement. In relation thereto, the present disclosure will be described with reference to FIGS. 9A and 9B.

Figure 9A:
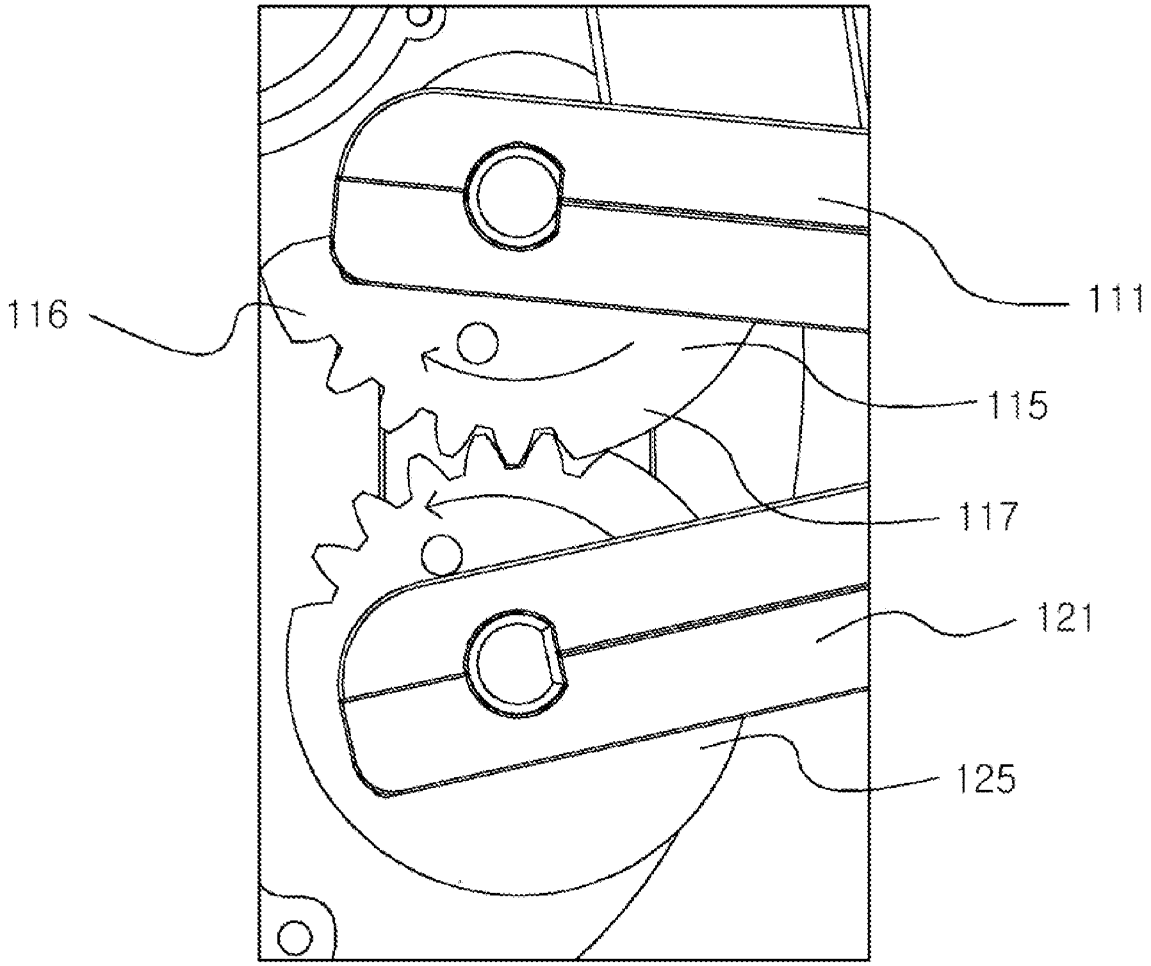
Figure 9B:
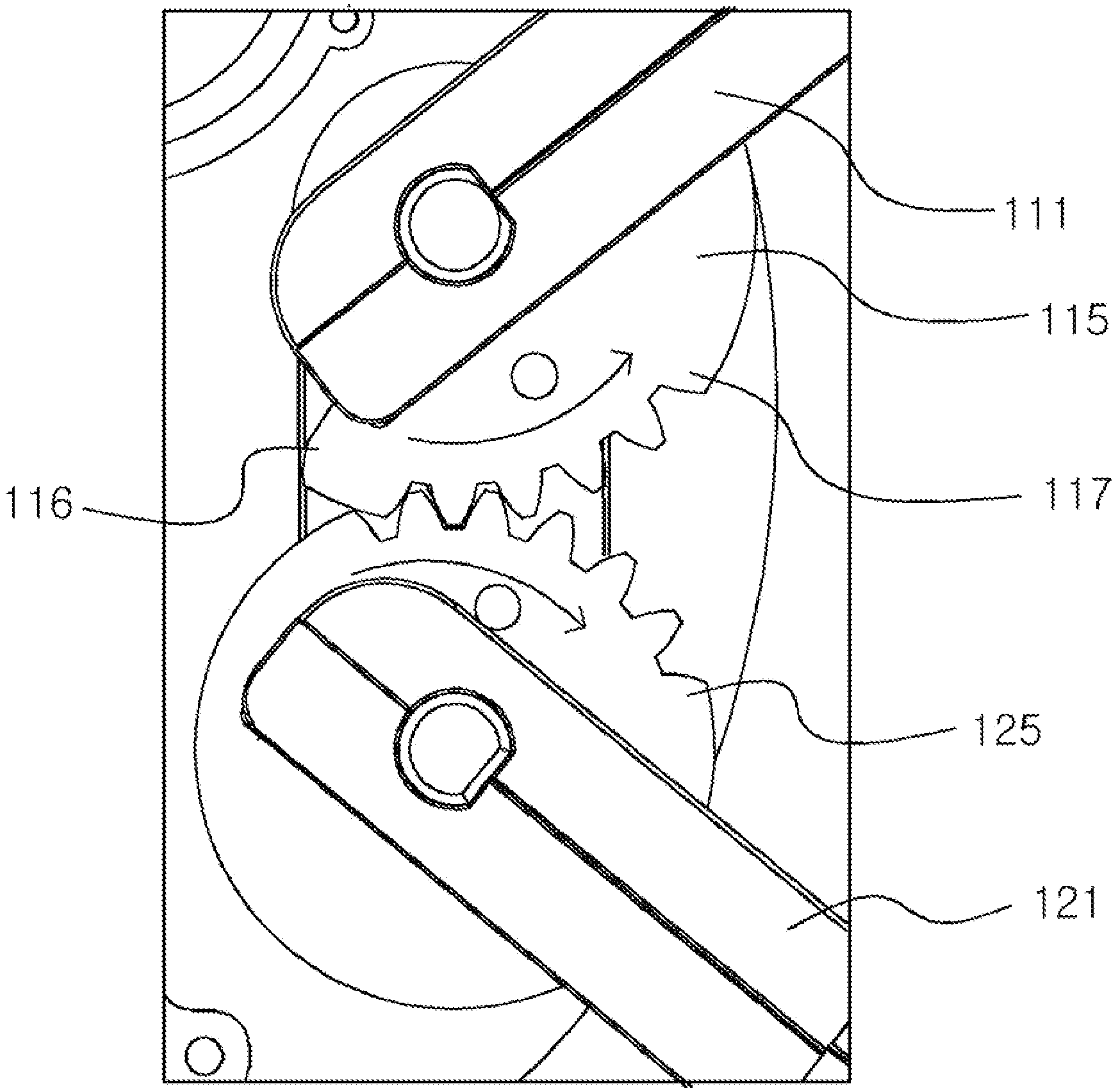

FIGS. 9A and 9B are enlarged views illustrating the finger gears included in the massage module according to one embodiment of the present invention.

The upper finger gear 115 may include a first stopper gear groove 117 and a second stopper gear groove 116. The first stopper gear groove 117 may hold and restrict rotational movement of the upper finger gear 115 in the first direction, and the second stopper gear groove 116 may hold and restrict rotational movement of the upper finger gear 115 in the second direction.

Referring to FIG. 9A, when the upper finger gear 115 rotates in the first direction, a rotational section thereof may be restricted by the first stopper gear groove 117. Accordingly, a rotational section of the lower finger gear 125 in the second direction may also be restricted. In this case, the upper finger member 110 may move downward and the lower finger member 120 may move upward. Here, mobile displacement thereof may be restricted.

Referring to FIG. 9B, when the upper finger gear 115 rotates in the second direction, a rotational section thereof may be restricted by the second stopper gear groove 116. Accordingly, a rotational section of the lower finger gear 125 in the first direction may also be restricted. In this case, the upper finger member 110 may move upward and the lower finger member 120 may move downward. Here, mobile displacement thereof may be restricted.

Hereinafter, the lateral driving portion 300 and driving mechanisms of the lateral driving portion 300 will be described in detail with reference to FIG. 10.

Figure 10:
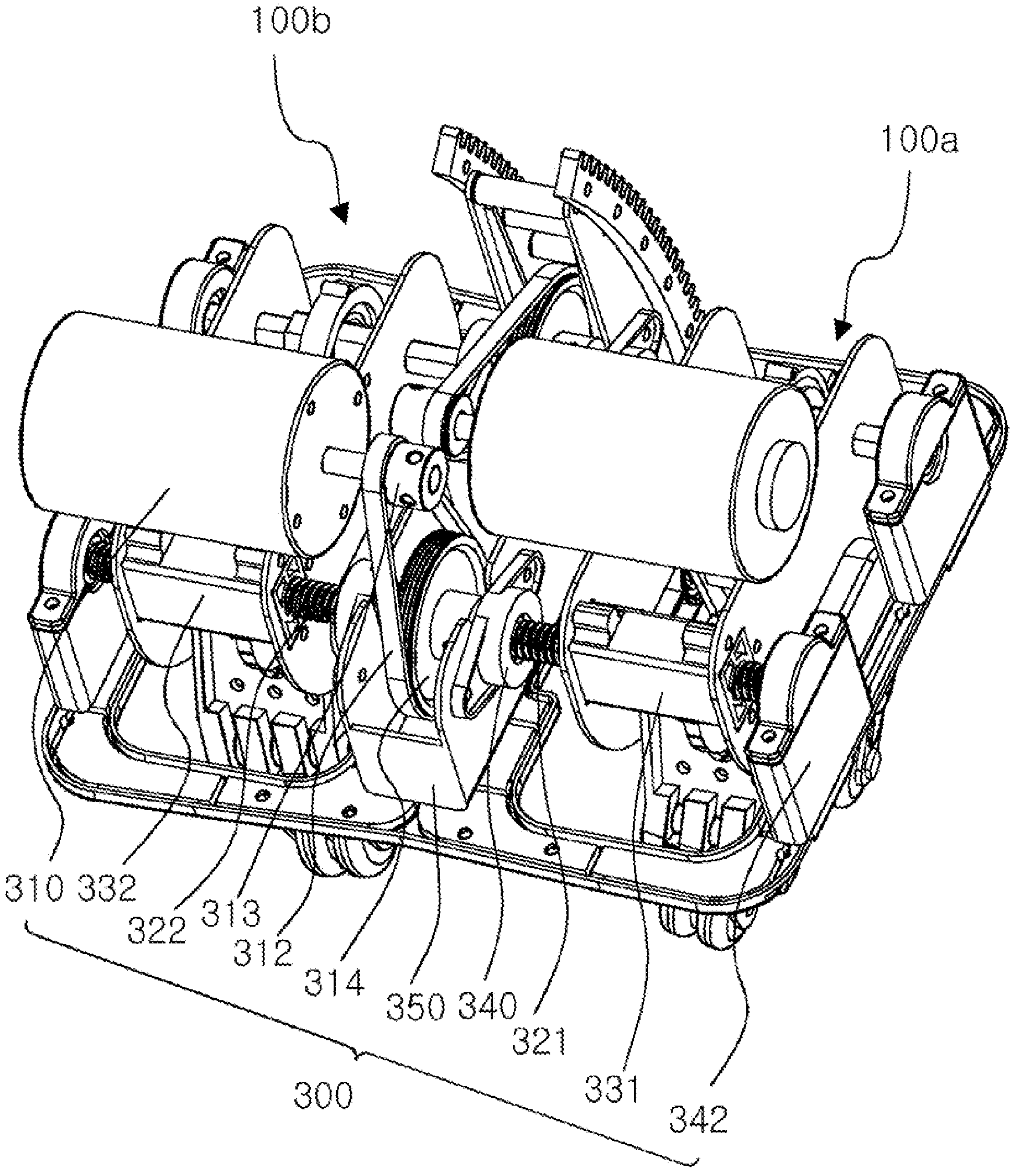

FIG. 10 is a view illustrating driving mechanisms of the lateral driving portion included in the massage module according to one embodiment of the present invention.

Referring to FIG. 10, the lateral driving portion 300 may include a lateral driving portion housing 350 which is a body configured to accommodate a variety of components thereinside. The lateral driving portion 300 may include the left and right driving motors 310, the two rotational shafts 321 and 322, and the two rotational shaft housings 331 and 332. The lateral driving portion 300 may further include the small lateral driving pulley 313, the large lateral driving pulley 314, and the lateral driving belt 312 as components configured to connect the left and right driving motors 310 to the two rotational shafts 321 and 322. The lateral driving portion 300 may be mounted on the rear surface of the main bracket 105 by the lateral driving portion housing 350.

The lateral driving motor 310 is a driving power source of the lateral driving portion 300 and may generate a rotational force.

A first rotational shaft 321 and a second rotational shaft 322 may receive rotational power of the lateral driving motor 310. The small lateral driving pulley 313 may be mounted on the lateral driving motor 310, and the first rotational shaft 321 and the second rotational shaft 322 may be mounted on both sides of the large lateral driving pulley 314. The rotational power of the lateral driving motor 310 may be transmitted to the first rotational shaft 321 and the second rotational shaft 322 by the lateral driving belt 312 which binds the small lateral driving pulley 313 and the large lateral driving pulley 314. Accordingly, the first rotational shaft 321 and the second rotational shaft 322 may rotate corresponding to driving of the lateral driving motor 310.

In detail, as an example, one side of the first rotational shaft 321 may be connected to the large lateral driving pulley 314 and the other side may be connected to a rotational shaft support member 342 through the rotational shaft connection member 340. The rotational shaft connection member 340 may be fixedly installed on a side surface of the lateral driving portion housing 350, and a rotational shaft bearing housing 342 may be fixedly installed on the rear surface of the main bracket 105. Accordingly, the first rotational shaft 321 may be formed between the large lateral driving pulley 314 and the rotational shaft support member 342 and rotate corresponding to driving of the lateral driving motor 310. Rotational shaft bearings may be inserted between the first rotational shaft 321 and the rotational shaft connection member 340 and between the first rotational shaft 321 and the rotational shaft support member 342, and the rotational shaft bearings may prevent a load, vibrations, noise, or the like generated when the first rotational shaft 321 rotates.

The first rotational shaft 321 and the second rotational shaft 322 may include screws in mutually opposite directions. For example, when the massage module 1700 is viewed from the front, the first rotational shaft 321 formed on a right side of the massage module 1700 may include a right screw. When the massage module 1700 is viewed from the front, the second rotational shaft 322 formed on a left side of the massage module 1700 may include a left screw. Otherwise, the first rotational shaft 321 may include the left screw and the second rotational shaft 322 may include the right screw opposite to a direction of the screw formed on the first rotational shaft 321.

A first rotational shaft housing 331 and a second rotational shaft housing 332 may be installed on the first treatment member 100*a* and the second treatment member 100*b*, respectively. For example, the first rotational shaft housing 331 and the second rotational shaft housing 332 may be installed in the treatment member housing 140 in which the first treatment member 100*a* and the second treatment member 100*b* are at least partially accommodated.

The first rotational shaft 321 and the second rotational shaft 322 may be inserted into the first rotational shaft housing 331 and the second rotational shaft housing 332, respectively. To this end, the first rotational shaft housing 331 and the second rotational shaft housing 332 may be formed corresponding to screw directions and shapes of the first rotational shaft 321 and the second rotational shaft 322, respectively.

The pair of treatment members 100*a* and 100*b* may move laterally due to the lateral driving portion 300. The lateral driving portion 300 may laterally move the first treatment member 100*a* and the second treatment member 100*b* to be away from or close to each other.

In detail, the lateral driving portion 300 may move the first treatment member 100*a* and the second treatment member 100*b* to be away from each other by driving the lateral driving motor 310 to rotate forward (for example, in a clockwise direction). The first rotational shaft 321 and the second rotational shaft 322 may rotate corresponding to driving of the lateral driving motor 310. Simultaneously, the first rotational shaft housing 331 engaged with the first rotational shaft 321 may move rightward, and the second rotational shaft housing 332 engaged with the second rotational shaft 322 on which the screw is formed in a direction opposite to the first rotational shaft 321 may move leftward. Accordingly, the first treatment member 100*a* on which the first rotational shaft housing 331 is mounted moves rightward and the second treatment member 100*b* on which the second rotational shaft housing 332 is mounted moves leftward so that the first treatment member 100*a* and the second treatment member 100*b* may be away from each other.

An operation for allowing the first treatment member 100*a* and the second treatment member 100*b* to be close to each other has the same mechanisms as an operation for allowing the first treatment member 100*a* and the second treatment member 100*b* to be away from each other and may be implemented by rotating the lateral driving motor 310 in a reverse direction.

Although it has been described above as an example that the pair of treatment members 100*a* and 100*b* are moved laterally to be away from or close to each other, the pair of treatment members 100*a* and 100*b* may move together leftward or rightward in the same direction according to a design of the lateral driving portion 300. Also, the rotational shafts 321 and 322 of the lateral driving portion 300 may be singularly provided and installed to pass through the lateral driving portion housing 350 instead of two rotational shafts being installed on both sides. Also, the rotational shafts 321 and 322 may be collinearly installed but the first rotational shaft 321 and the second rotational shaft 322 may be installed to be tilted to form a certain angle therebetween. Also, the lateral driving portion 300 may employ an eccentric rotation method like the cam unit 220, and the pair of treatment members 100*a* and 100*b* may move laterally through eccentric rotation. In this case, the rotational shafts 321 and 322 may function as a reference axis of eccentric rotation without screws being formed thereon.

Hereinafter, referring to FIGS. 11 and 12, the vertical driving portion 400 and the front-rear driving portion 500 will be described in detail.

Figure 11:
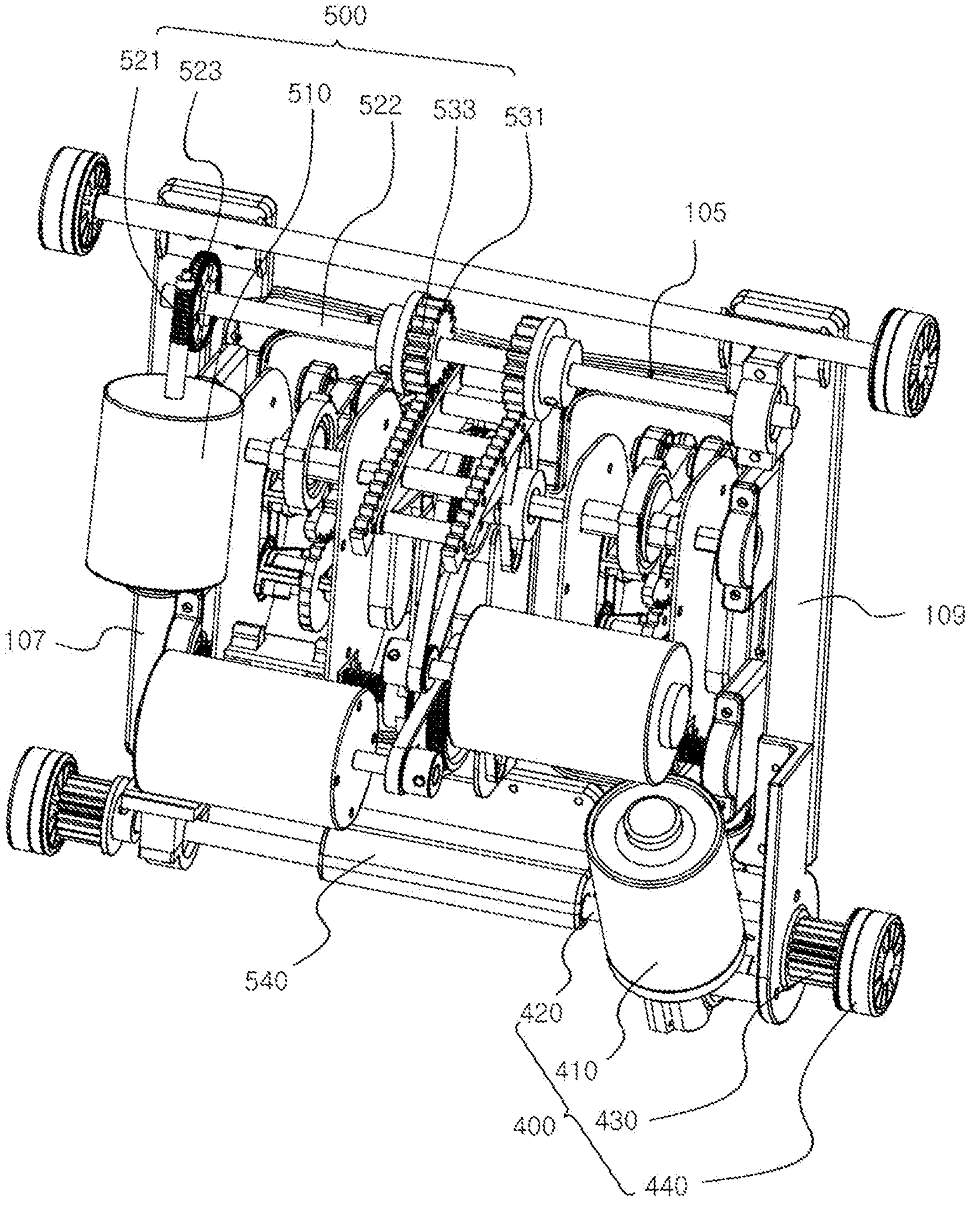

FIG. 11 is a rear view of the massage module according to one embodiment of the present invention.

Referring to FIG. 11, the vertical driving portion 400 may include a vertical driving motor 410, a vertical movement shaft 420, a vertical movement pinion gear 430, and a vertical movement roller 440.

The vertical driving motor 410 is a driving power source of the vertical driving portion 400 and may generate a rotational force.

The vertical movement shaft 420 may rotate corresponding to driving of the vertical driving portion 400. The vertical movement shaft 420 may be located below the main bracket 105. The vertical movement shaft 420 may be located below the main bracket 105 due to a connection member installed on a left bracket 109. Otherwise, the vertical movement shaft 420 may be installed on a right bracket 107 by a connection member.

The vertical movement pinion gear 430 may be inserted into both sides of the vertical movement shaft 420. The vertical movement pinion gear 430 may rotate corresponding to rotation of the vertical movement shaft 420. The vertical movement pinion gear 430 may be coupled to an external vertical movement rack gear through a rack and pinion method and be engaged with the external movement rack gear so as to move while rotating.

The vertical movement rollers 440 may be installed on both sides of the vertical movement shaft 420. The vertical movement roller 440 may be installed outside the vertical movement pinion gear 430. The vertical movement roller 440 may move along an external vertical movement rail. The vertical movement roller 440 may be inserted into the vertical movement rail opened inward and move along the vertical movement rail so as to guide and support movement of the vertical movement pinion gear 430. The vertical driving portion 400 may include a component of a movement roller configured to move along the external vertical movement rail even above the main bracket 105.

The massage module 1700 may be vertically moved by the vertical driving portion 400. That is, the vertical driving portion 400 may vertically move the treatment member 100.

In detail, the vertical driving portion 400 may move the massage module 1700 upward by rotating the vertical driving motor 410 forward (for example, in a clockwise direction). The vertical movement shaft 420 may rotate corresponding to rotation of the vertical driving motor 410. Simultaneously, the vertical movement pinion gear 430 and the vertical movement roller 440 may move upward along the vertical movement rack gear and the vertical movement rail, respectively.

Downward movement of the massage module 1700 may be performed by mechanisms equal to mechanisms for implementing an upward movement operation of the massage module 1700 but may be implemented to rotate the vertical driving motor 410 in a reverse direction.

Meanwhile, the front-rear driving portion 500 may include the front-rear driving motor 510, the front-rear driving motor screw 521, the front-rear movement shaft 522, and the direction switching gear 523. The front-rear driving portion 500 may further include the front-rear movement rack gear 531 and the front-rear movement pinion gear 533. The front-rear driving portion 500 may further include the front-rear movement bracket 540 installed at the bottom end of the main bracket 105.

The front-rear driving motor 510 is a driving power source of the front-rear driving portion 500 and may generate a rotational force.

The front-rear driving motor screw 521 may be connected to the driving shaft of the front-rear driving motor 510 and rotate corresponding to driving of the front-rear driving motor 510.

The front-rear movement shaft 522 may be formed in a direction intersecting with the front-rear driving motor screw 521. The front-rear movement shaft 522 may be located at a top end of the main bracket 105. Both sides of the front-rear movement shaft 522 may be installed on rear surfaces of the right bracket 107 and the left bracket 109 using the connection members.

The front-rear movement shaft 522 may be inserted into and installed in the direction switching gear 523. The direction switching gear 523 may be located to come into contact with the front-rear driving motor screw 521 and rotate while being engaged with the front-rear driving motor screw 521. Accordingly, the direction switching gear 523 may switch and transmit a rotational direction of the front-rear driving motor screw 521 to the front-rear movement shaft 522.

The front-rear movement shaft 522 may be inserted into and installed in the front-rear movement pinion gear 533. Accordingly, the front-rear movement pinion gear 533 may rotate corresponding to rotation of the front-rear movement shaft 522.

The front-rear movement rack gear 531 may be located to come into contact with the front-rear movement pinion gear 533. The front-rear movement rack gear 531 may be coupled to the front-rear movement pinion gear 533 using a rack and pinion method and be engaged with and rotate along the front-rear movement pinion gear 533. The front-rear movement rack gear 531 may be formed on the rear surface of the main bracket 105.

The front-rear movement rack gear 531 may be designed to be a fan-shaped arc and provide movement displacement in a front-rear direction of the main bracket 105. The front-rear movement rack gear 531 may be provided to be rotatable only within a rotational section having a certain range according to a design of a shape, a central angle, and the like and not to rotate anymore and to rotate in an opposite direction when departing from the range of the rotational section.

The front-rear movement bracket 540 may be installed at the bottom end of the main bracket 105. The vertical movement shaft 420 may be inserted into and installed in the front-rear movement bracket 540. The front-rear movement bracket 540 may support the main bracket 105 when the main bracket 105 moves in a front-rear direction.

The main bracket 105 may be rotated in a front-rear direction by the front-rear driving portion 500. That is, the front-rear driving portion 500 may rotate and move the treatment member 100 in a front-rear direction. In relation thereto, it will be described in detail with reference to FIG. 12.

Figure 12:
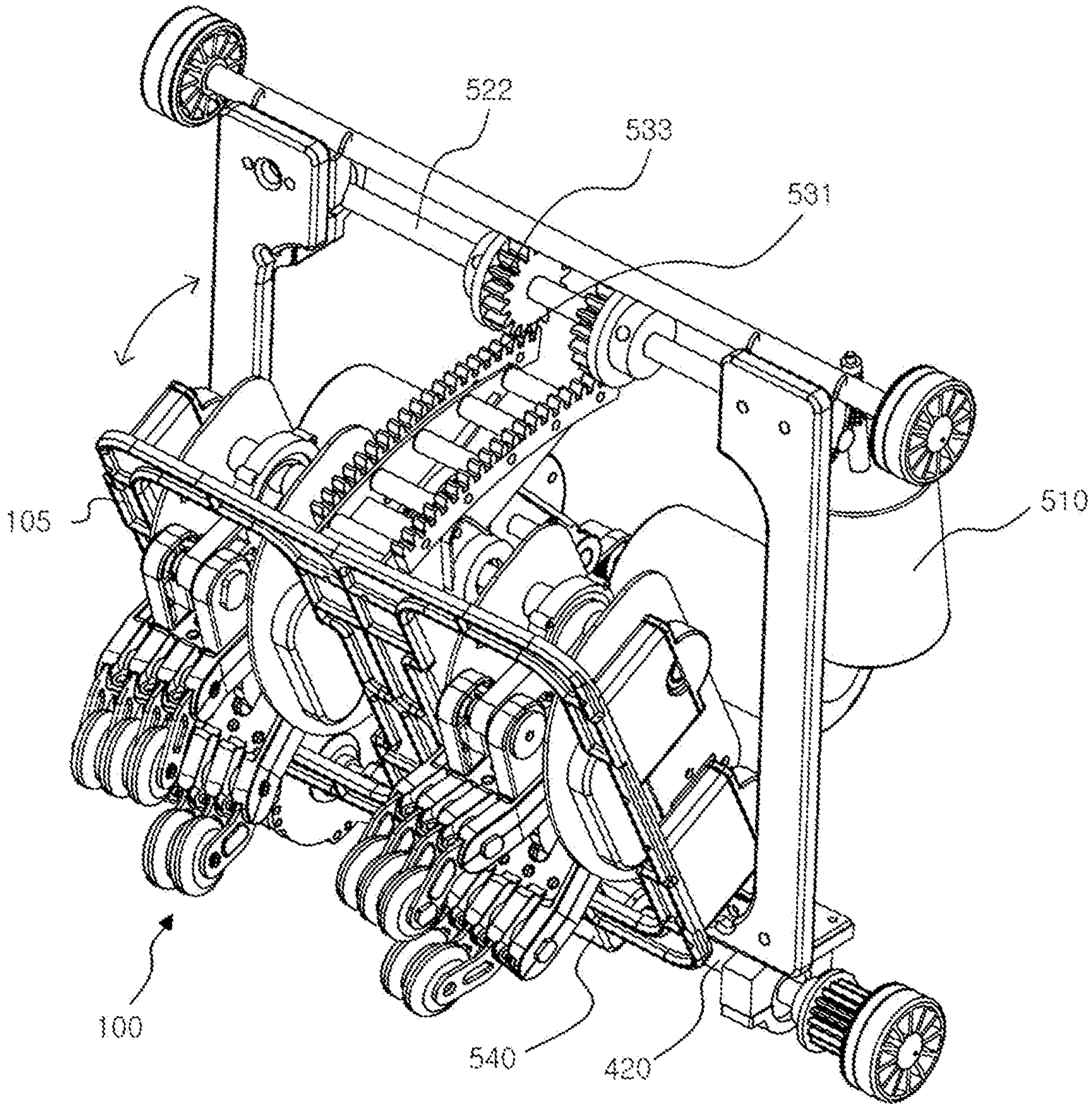

FIG. 12 is a view illustrating driving mechanisms of the front-rear driving portion included in the massage module according to one embodiment of the present invention.

Referring to FIG. 12, the front-rear driving portion 500 may drive the front-rear driving motor 510 forward (for example, in a clockwise direction). The front-rear driving motor screw 521 may rotate corresponding to rotation of the front-rear driving motor 510. Simultaneously, the direction switching gear 523 may rotate while being engaged with the front-rear driving motor screw 521, and the front-rear movement shaft 522 inserted in the direction switching gear 523 may rotate corresponding thereto. The front-rear movement pinion gear 533 in which the front-rear movement shaft 522 is inserted may also rotate and move the front-rear movement rack gear 531 forward. Here, the bottom end of the main bracket 105 may be fixed to the vertical movement shaft 420 by the front-rear movement bracket 540. Accordingly, the main bracket 105 may rotate and move forward with the vertical movement shaft 420 as a reference shaft.

Backward movement of the main bracket 105 may be performed by mechanisms equal to mechanisms for implementing a forward movement operation of the main bracket 105 but may be implemented to rotate the front-rear driving motor 510 in a reverse direction. The front-rear driving portion 500 may drive the front-rear driving motor 510 backward (for example, in a counterclockwise direction). The front-rear movement shaft 522 may receive a rotational force of the front-rear driving motor 510 from the direction switching gear 523 and rotate. Simultaneously, the front-rear movement pinion gear 533 may rotate and move the front-rear movement rack gear 531 backward. Accordingly, the main bracket 105 may rotate and move backward with the vertical movement shaft 420 as a reference shaft.

Although it has been described above that the treatment member 100 rotates and moves in a front-rear direction, the treatment member 100 may employ a method of moving linearly in a front-rear direction according to a design of the front-rear driving portion 500.

Although the embodiments of the present invention have been described above with reference to the attached drawings, the above embodiments should be understood as being exemplary in all aspects and not limitative.

The invention claimed is:

1. A massage module comprising:

a treatment member including a first finger member, a second finger member disposed adjacent to the first finger member and configured to cooperate with the first finger member, and a cam link non-rotatably coupled to the first finger member; and a cam driving portion connected to the first finger member by the cam link and configured to move the first finger member and the second finger member to be away from or close to each other in a first direction or in a second direction opposite to the first direction.

2. The massage module of claim 1, wherein the cam driving portion is configured to move the first finger member in the first direction and the second direction through eccentric rotation, and wherein the second finger member is configured to move away from or close to the first finger member while cooperating with movement of the first finger member.

3. The massage module of claim 1, wherein the treatment member comprises two finger gears disposed on the first finger member and the second finger member, respectively, and the two finger gears configured to be engaged with each other and to rotate in mutually opposite directions.

4. The massage module of claim 1, wherein the cam driving portion comprises:

a cam driving motor configured to generate a rotational force;

a kneading shaft connected to a driving shaft of the cam driving motor and configured to rotate corresponding to drive of the cam driving motor; and a cam unit connected to the kneading shaft and configured to eccentrically rotate on the kneading shaft corresponding to rotation of the kneading shaft.

5. The massage module of claim 4, wherein the cam unit comprises:

an unbalanced cover connected to the kneading shaft; and a cam cover in which the unbalanced cover is fit and to which the unbalanced cover is coupled.

6. The massage module of claim 5, wherein the cam unit further comprises a cam bearing inserted between the unbalanced cover and the cam cover.

7. The massage module of claim 1, wherein the treatment member comprises:

a first finger gear configured to rotate corresponding to movement of the first finger member wherein a stopper gear groove is defined on the first finger gear and configured to hold and regulate rotational movement of the first finger gear to restrict movement displacement of the first finger member; and a second finger gear disposed to come into contact with the first finger gear and configured to transmit a rotational force in a direction opposite to a rotation direction of the first finger gear to the second finger member.

8. The massage module of claim 1, wherein the treatment member comprises the cam link which has a first portion connected to the cam driving portion by a pin connection structure having a centric through-hole and a second portion non-rotatably installed on the first finger member, wherein the pin connection structure is configured to move the first finger member and the second finger member to be away from or close to each other in the first and the second direction.

9. The massage module of claim 8, wherein the pin connection structure comprises:

a cam cover protruding portion disposed on the cam driving portion, wherein the centric through-hole is defined in the cam cover protruding portion, and wherein a cam unit is configured to be adjusted in angle with the cam link when the cam link eccentrically rotates.

10. The massage module of claim 9, wherein the pin connection structure comprises:

the cam link having a first cam link and a second cam link;

a cam shaft insertion hole defined in each of the first cam link and the second cam link; and a cam shaft inserted into the centric through-hole and the cam shaft insertion hole of the first cam link and the cam shaft insertion hole of the second cam link, wherein the cam cover protruding portion is disposed between the first cam link and the second cam link, and wherein a size and a shape of the centric through-hole corresponds to a size and a shape of the cam shaft insertion hole.

11. The massage module of claim 1, wherein the treatment member comprises a first treatment member and a second treatment member disposed on a first side and a second side of a main bracket, respectively, wherein the second side is disposed adjacent to the first side, and the first treatment member and the second treatment member are installed to be tilted at a predetermined angle toward a center.

12. The massage module of claim 1, wherein the treatment member comprises:

a first finger housing link-connected to the cam driving portion;

a first finger bracket installed or disposed on the first finger housing to have a predetermined angle therebelow; and a first massage roller rotatably installed on the first finger bracket and configured to perform a massage.

13. The massage module of claim 1, wherein the treatment member comprises:

a second finger housing;

a second finger bracket installed or disposed on the second finger housing to have a predetermined angle thereabove; and a second massage roller rotatably installed on the second finger bracket and configured to perform a massage.

14. The massage module of claim 1, further comprising a lateral driving portion configured to laterally move the treatment member.

15. The massage module of claim 1, wherein the treatment member comprises a first treatment member and a second treatment member, and wherein the massage module further comprises a lateral driving portion configured to laterally move the first treatment member and the second treatment member to be away from or close to each other.

16. The massage module of claim 15, wherein the lateral driving portion further comprises:

a lateral driving motor configured to generate a rotational force;

a first rotational shaft and a second rotational shaft, each configured to rotate corresponding to the rotational force of the lateral driving motor, wherein the first rotational shaft has a first screw in a first screw direction and the second rotational shaft has a second screw in a second screw direction opposite to the first screw direction; and a first rotational shaft housing and a second rotational shaft housing disposed on the first treatment member and the second treatment member, respectively, wherein the first rotational shaft housing and the second rotational shaft housing are disposed corresponding to the first screw direction and the second screw direction and a shape of the first rotational shaft and a shape of the second rotational shaft.

17. The massage module of claim 1, further comprising a front-rear driving portion configured to move the treatment member in a front-rear direction.

18. The massage module of claim 1, further comprising a vertical driving portion configured to vertically move the treatment member.

* * * * *